US012195674B2

United States Patent
Polasek et al.

(10) Patent No.: US 12,195,674 B2
(45) Date of Patent: Jan. 14, 2025

(54) USING SPENT CAUSTIC SOLUTION FROM PYGAS TREATMENT TO NEUTRALIZE HALOGENS FROM LIQUIFIED WASTE PLASTIC

(71) Applicant: Eastman Chemical Company, Kingsport, TN (US)

(72) Inventors: Michael Gary Polasek, Longview, TX (US); Daryl Bitting, Longview, TX (US); Xianchun Wu, Longview, TX (US); David Eugene Slivensky, Tatum, TX (US)

(73) Assignee: Eastman Chemical Company, Kingsport, TN (US)

( * ) Notice: Subject to any disclaimer, the term of this patent is extended or adjusted under 35 U.S.C. 154(b) by 150 days.

(21) Appl. No.: 17/932,686

(22) Filed: Sep. 16, 2022

(65) Prior Publication Data

US 2023/0089058 A1 Mar. 23, 2023

Related U.S. Application Data

(60) Provisional application No. 63/261,432, filed on Sep. 21, 2021.

(51) Int. Cl.
*C10G 1/10* (2006.01)
*B01D 53/14* (2006.01)
(Continued)

(52) U.S. Cl.
CPC .......... *C10G 1/10* (2013.01); *B01D 53/1475* (2013.01); *B01D 53/48* (2013.01); *B01D 53/68* (2013.01);
(Continued)

(58) Field of Classification Search
None
See application file for complete search history.

(56) References Cited

U.S. PATENT DOCUMENTS 1,048,530 A 12/1912 Harlow
1,219,162 A 3/1917 Runge
(Continued)

FOREIGN PATENT DOCUMENTS

CN 1309112 A 8/2001
CN 1434015 A 8/2003
(Continued)

OTHER PUBLICATIONS

Co-pending U.S. Appl. No. 17/755,326, filed Apr. 27, 2022; Wu et al.
(Continued)

*Primary Examiner* — In Suk C Bullock
*Assistant Examiner* — Alyssa L Cepluch
(74) *Attorney, Agent, or Firm* — Dennis V. Carmen

(57) ABSTRACT

Processes and facilities for producing recycled chemical products from waste plastic are described herein. The processes include treating process streams, such as a pyrolysis gas stream and/or at least a portion of a cracker furnace effluent stream, in a caustic scrubber process to remove certain components, such as carbon dioxide. The spent caustic solution from the caustic scrubber process is then recycled and reused in other caustic processes within the facility, which can include a halogen neutralization process from removing halogens from a liquification process off-gas.

14 Claims, 3 Drawing Sheets

(51) Int. Cl.
*B01D 53/48* (2006.01)
*B01D 53/68* (2006.01)
*B01D 53/78* (2006.01)
*C10G 1/00* (2006.01)
*C10G 53/02* (2006.01)

(52) U.S. Cl.
CPC .............. *B01D 53/78* (2013.01); *C10G 1/002* (2013.01); *C10G 53/02* (2013.01); *B01D 2257/204* (2013.01); *C10G 2300/1003* (2013.01); *C10G 2300/202* (2013.01); *C10G 2300/4043* (2013.01); *C10G 2300/405* (2013.01); *C10G 2300/4056* (2013.01)

(56) References Cited

U.S. PATENT DOCUMENTS

| | | |
|---|---|---|
| 1,683,347 A | 9/1928 | Gray et al. |
| 1,698,049 A | 1/1929 | Clarke et al. |
| 1,880,560 A | 10/1932 | Webber et al. |
| 1,880,808 A | 10/1932 | Clarke et al. |
| 1,984,147 A | 12/1934 | Malm |
| 2,026,985 A | 1/1936 | Malm et al. |
| 2,129,052 A | 9/1938 | Fordyce |
| 2,163,013 A | 6/1939 | Schulz |
| 2,294,984 A | 9/1942 | Hasche |
| 2,337,004 A | 12/1943 | Schwoegler |
| 2,368,704 A | 2/1945 | Carlson |
| 2,464,916 A | 3/1949 | Adams et al. |
| 2,880,241 A | 3/1959 | Hughes |
| 2,892,858 A | 6/1959 | Ziegler |
| 3,091,632 A | 5/1963 | Hagemeyer et al. |
| 3,239,566 A | 3/1966 | Slaugh et al. |
| 3,291,821 A | 12/1966 | Perry et al. |
| 3,340,312 A | 9/1967 | Duke, Jr. et al. |
| 3,351,657 A | 11/1967 | Duncanson et al. |
| 3,448,157 A | 6/1969 | Slaugh et al. |
| 3,448,173 A | 6/1969 | Francis et al. |
| 3,527,809 A | 9/1970 | Pruett et al. |
| 3,544,291 A | 12/1970 | Schlinger et al. |
| 3,617,201 A | 11/1971 | Berni et al. |
| 3,631,225 A | 12/1971 | Tenney et al. |
| 3,655,825 A | 4/1972 | Souder et al. |
| 3,660,447 A | 5/1972 | Cragg et al. |
| 3,676,523 A | 7/1972 | Mason |
| 3,686,334 A | 8/1972 | Britton |
| 3,718,689 A | 2/1973 | McCain et al. |
| 3,853,968 A | 12/1974 | Bortnick et al. |
| 3,857,895 A | 12/1974 | Booth |
| 4,097,363 A | 6/1978 | McKinney et al. |
| 4,147,603 A | 4/1979 | Pacifici et al. |
| 4,148,830 A | 4/1979 | Pruett et al. |
| 4,169,861 A | 10/1979 | Hughes |
| 4,216,337 A | 8/1980 | Baba et al. |
| 4,218,339 A | 8/1980 | Zucchini et al. |
| 4,225,726 A | 9/1980 | Morris et al. |
| 4,248,802 A | 2/1981 | Kuntz |
| 4,263,449 A | 4/1981 | Saito et al. |
| 4,287,369 A | 9/1981 | Harris et al. |
| 4,287,370 A | 9/1981 | Harris et al. |
| 4,303,594 A | 12/1981 | Norton et al. |
| 4,316,990 A | 2/1982 | Morris |
| 4,332,564 A | 6/1982 | Lord |
| 4,436,532 A | 3/1984 | Yamaguchi et al. |
| 4,443,638 A | 4/1984 | Yates |
| 4,446,585 A | 5/1984 | Harding et al. |
| 4,479,012 A | 10/1984 | Fischer et al. |
| 4,482,640 A | 11/1984 | Knudsen et al. |
| 4,515,659 A | 5/1985 | Wingfield, Jr. et al. |
| 4,536,597 A | 8/1985 | Pesa et al. |
| 4,548,706 A | 10/1985 | Papadopoulos et al. |
| 4,564,647 A | 1/1986 | Hayashi et al. |
| 4,593,127 A | 6/1986 | Bunning et al. |
| 4,625,068 A | 11/1986 | Young |
| 4,699,998 A | 10/1987 | Green |
| 4,742,178 A | 5/1988 | Nelson et al. |
| 4,755,624 A | 7/1988 | Phillips et al. |
| 4,758,645 A | 7/1988 | Miyazono et al. |
| 4,774,362 A | 9/1988 | Devon et al. |
| 4,808,756 A | 2/1989 | Tokitoh et al. |
| 4,839,230 A | 6/1989 | Cook |
| 4,861,629 A | 8/1989 | Nahm |
| 4,871,878 A | 10/1989 | Puckette et al. |
| 4,873,213 A | 10/1989 | Puckette et al. |
| 4,912,155 A | 3/1990 | Burton |
| 4,960,949 A | 10/1990 | Devon et al. |
| 5,004,845 A | 4/1991 | Bradley et al. |
| 5,082,914 A | 1/1992 | Cook et al. |
| 5,087,763 A | 2/1992 | Sorensen |
| 5,114,089 A | 5/1992 | Posso |
| 5,137,954 A | 8/1992 | DasGupta et al. |
| 5,180,847 A | 1/1993 | Thurman et al. |
| 5,182,379 A | 1/1993 | Cook et al. |
| 5,202,463 A | 4/1993 | Ruszkay |
| 5,264,600 A | 11/1993 | Lappe et al. |
| 5,292,877 A | 3/1994 | Edgar et al. |
| 5,292,979 A | 3/1994 | Chauvin et al. |
| 5,312,951 A | 5/1994 | Herrmann et al. |
| 5,347,045 A | 9/1994 | Herrmann et al. |
| 5,364,995 A | 11/1994 | Kirkwood et al. |
| 5,368,723 A | 11/1994 | Takahashi et al. |
| 5,384,163 A | 1/1995 | Budde et al. |
| 5,504,259 A | 4/1996 | Diebold et al. |
| 5,534,594 A | 7/1996 | Troy et al. |
| 5,557,014 A | 9/1996 | Grate et al. |
| 5,639,937 A | 6/1997 | Hover et al. |
| 5,663,444 A | 9/1997 | Melder et al. |
| 5,684,097 A | 11/1997 | Palmroos et al. |
| 5,723,151 A | 3/1998 | Cook et al. |
| 5,731,483 A | 3/1998 | Stabel et al. |
| 5,741,901 A | 4/1998 | Cook et al. |
| 5,750,677 A | 5/1998 | Edgar et al. |
| 5,770,017 A | 6/1998 | Brown et al. |
| 5,770,664 A | 6/1998 | Okumura et al. |
| 5,830,981 A | 11/1998 | Koreishi et al. |
| 5,852,143 A | 12/1998 | Sishta et al. |
| 5,866,725 A | 2/1999 | Unruh et al. |
| 5,871,573 A | 2/1999 | Cook et al. |
| 5,977,407 A | 11/1999 | Zoeller et al. |
| 5,981,738 A | 11/1999 | Cook et al. |
| 6,075,168 A | 6/2000 | DiGuilio et al. |
| 6,121,394 A | 9/2000 | Sugimoto et al. |
| 6,184,428 B1 | 2/2001 | Zahoor et al. |
| 6,277,778 B1 | 8/2001 | Leino et al. |
| 6,278,030 B1 | 8/2001 | Vargas et al. |
| 6,331,580 B1 | 12/2001 | Molnar |
| 6,344,530 B2 | 2/2002 | Sugano et al. |
| 6,362,367 B2 | 3/2002 | Braithwaite et al. |
| 6,369,214 B1 | 4/2002 | Tye et al. |
| 6,458,992 B1 | 10/2002 | Lederer et al. |
| 6,476,171 B1 | 11/2002 | Lue et al. |
| 6,492,564 B1 | 12/2002 | Wiese et al. |
| 6,559,342 B1 | 5/2003 | Tsuneki et al. |
| 6,642,323 B1 | 11/2003 | Myhre et al. |
| 6,693,213 B1 | 2/2004 | Kolena et al. |
| 6,693,219 B2 | 2/2004 | Puckette et al. |
| 6,730,756 B1 | 5/2004 | Andell et al. |
| 6,818,584 B2 | 11/2004 | Garoff et al. |
| 6,825,255 B2 | 11/2004 | Yuan et al. |
| 6,960,635 B2 | 11/2005 | Stevens et al. |
| 7,049,473 B2 | 5/2006 | Mackewitz et al. |
| 7,128,827 B2 | 10/2006 | Tallman et al. |
| 7,329,774 B2 | 2/2008 | Zuber et al. |
| 7,420,092 B2 | 9/2008 | Fujita et al. |
| 7,589,145 B2 | 9/2009 | Brant et al. |
| 7,601,666 B2 | 10/2009 | Rix et al. |
| 7,638,314 B2 | 12/2009 | Zappi et al. |
| 7,767,613 B2 | 8/2010 | Mihan |
| 7,816,465 B2 | 10/2010 | Andtsjo |
| 7,897,679 B2 | 3/2011 | Stevens et al. |
| 7,935,850 B2 | 5/2011 | Caers et al. |
| 7,972,498 B2 | 7/2011 | Buchanan et al. |
| 8,344,195 B2 | 1/2013 | Srinakruang |
| 8,354,563 B2 | 1/2013 | Kharas |

(56) References Cited

U.S. PATENT DOCUMENTS

| | | |
|---|---|---|
| 8,404,911 B2 | 3/2013 | Srinakruang |
| 8,426,652 B2 | 4/2013 | Jevtic et al. |
| 8,641,787 B2 | 2/2014 | Morgan |
| 8,829,258 B2 | 9/2014 | Gong et al. |
| 8,895,790 B2 | 11/2014 | Narayanaswamy et al. |
| 8,981,165 B2 | 3/2015 | Carbone et al. |
| 9,096,801 B2 | 8/2015 | Baker |
| 9,181,156 B2 | 11/2015 | Ko et al. |
| 9,309,183 B2 | 4/2016 | Storzum et al. |
| 9,505,901 B2 | 11/2016 | Mohanty et al. |
| 9,809,508 B2 | 11/2017 | Keusenkothen et al. |
| 9,856,198 B1 | 1/2018 | Keen et al. |
| 10,040,735 B2 | 8/2018 | Levin |
| 10,214,600 B2 | 2/2019 | Somers et al. |
| 10,233,395 B2 | 3/2019 | Ward et al. |
| 10,344,226 B2 | 7/2019 | Schmidt et al. |
| 10,975,313 B2 | 4/2021 | Ramamurthy et al. |
| 11,319,262 B2 | 5/2022 | Wu et al. |
| 2007/0299280 A1 | 12/2007 | Zoeller et al. |
| 2008/0039540 A1 | 2/2008 | Reitz |
| 2008/0194808 A1 | 8/2008 | Buchanan et al. |
| 2009/0005605 A1 | 1/2009 | Hassan et al. |
| 2009/0036727 A1* | 2/2009 | Kurukchi ............ C10G 70/00 585/854 |
| 2010/0121097 A1 | 5/2010 | Sasaki et al. |
| 2011/0046365 A1 | 2/2011 | Mikkonen et al. |
| 2011/0046429 A1 | 2/2011 | Aliyev et al. |
| 2011/0257317 A1 | 10/2011 | Baugh et al. |
| 2011/0296745 A1 | 12/2011 | Hilten et al. |
| 2011/0308142 A1 | 12/2011 | Abhari et al. |
| 2012/0035404 A1 | 2/2012 | Alegria et al. |
| 2012/0125813 A1 | 5/2012 | Bridges et al. |
| 2012/0160659 A1 | 6/2012 | Koukios |
| 2012/0238741 A1 | 9/2012 | Buchanan et al. |
| 2012/0238742 A1 | 9/2012 | Buchanan et al. |
| 2012/0310023 A1 | 12/2012 | Huang et al. |
| 2013/0178672 A1 | 7/2013 | Chen et al. |
| 2013/0184505 A1 | 7/2013 | Maxwell |
| 2013/0296619 A1 | 11/2013 | Iaccino et al. |
| 2014/0031583 A1 | 1/2014 | Mazanec et al. |
| 2014/0107306 A1 | 4/2014 | Mazanec et al. |
| 2014/0155661 A1 | 6/2014 | Frediani et al. |
| 2014/0296407 A1 | 10/2014 | Marsh et al. |
| 2015/0284645 A1 | 10/2015 | Schmidt et al. |
| 2015/0307417 A1 | 10/2015 | Schmidt et al. |
| 2016/0083323 A1 | 3/2016 | Fruchey et al. |
| 2016/0090539 A1 | 3/2016 | Frey et al. |
| 2016/0097002 A1 | 4/2016 | Sundaram |
| 2016/0168491 A1 | 6/2016 | Yao et al. |
| 2016/0244677 A1 | 8/2016 | Froehle |
| 2016/0264874 A1 | 9/2016 | Narayanaswamy et al. |
| 2016/0264883 A1 | 9/2016 | Narayanaswamy et al. |
| 2016/0264884 A1 | 9/2016 | Narayanaswamy et al. |
| 2016/0264885 A1 | 9/2016 | Narayanaswamy et al. |
| 2016/0362609 A1 | 12/2016 | Ward et al. |
| 2017/0240822 A1 | 8/2017 | Karimzadeh |
| 2017/0348741 A1 | 12/2017 | Iijima et al. |
| 2017/0362512 A1 | 12/2017 | Hornung et al. |
| 2018/0002609 A1 | 1/2018 | Narayanaswamy et al. |
| 2018/0244905 A1 | 8/2018 | Wang et al. |
| 2018/0346838 A1 | 12/2018 | Vasudevan et al. |
| 2019/0023999 A1 | 1/2019 | Sundaram et al. |
| 2019/0055483 A1 | 2/2019 | Bafna et al. |
| 2019/0161683 A1* | 5/2019 | Narayanaswamy ... C10G 69/14 |
| 2019/0177626 A1 | 6/2019 | Ramamurthy et al. |
| 2019/0241838 A1 | 8/2019 | Scheibel et al. |
| 2019/0270939 A1* | 9/2019 | Javeed .................. C10G 1/002 |
| 2019/0299491 A1 | 10/2019 | Stanislaus et al. |
| 2019/0367428 A1 | 12/2019 | Ramamurthy et al. |
| 2019/0390124 A1 | 12/2019 | Oprins et al. |
| 2020/0017772 A1 | 1/2020 | Ramamurthy et al. |
| 2020/0017773 A1 | 1/2020 | Ramamurthy et al. |
| 2020/0308492 A1 | 10/2020 | Streiff et al. |
| 2020/0369965 A1 | 11/2020 | Bitting et al. |
| 2021/0130262 A1 | 5/2021 | Wu et al. |
| 2021/0130699 A1 | 5/2021 | Bitting et al. |
| 2021/0130700 A1 | 5/2021 | Wu et al. |
| 2021/0130708 A1 | 5/2021 | Xu et al. |
| 2021/0130710 A1 | 5/2021 | Xu et al. |
| 2021/0130712 A1 | 5/2021 | Abudawould et al. |
| 2021/0130713 A1 | 5/2021 | Xu et al. |
| 2021/0130714 A1 | 5/2021 | Abudawould et al. |
| 2021/0130715 A1 | 5/2021 | Xu et al. |
| 2021/0130716 A1 | 5/2021 | Xu et al. |
| 2021/0130717 A1 | 5/2021 | Xu et al. |
| 2021/0139620 A1 | 5/2021 | Slivensky et al. |
| 2022/0195315 A1 | 6/2022 | Zhang et al. |
| 2022/0220389 A1 | 7/2022 | Slivensky et al. |
| 2022/0220391 A1 | 7/2022 | Slivensky et al. |
| 2022/0227892 A1 | 7/2022 | Slivensky et al. |
| 2022/0228071 A1 | 7/2022 | Bitting et al. |
| 2022/0234968 A1 | 7/2022 | Wu et al. |
| 2022/0267679 A1 | 8/2022 | Bitting et al. |
| 2022/0281793 A1 | 9/2022 | Slivensky et al. |
| 2022/0281796 A1 | 9/2022 | Slivensky et al. |
| 2022/0289655 A1 | 9/2022 | Slivensky et al. |
| 2022/0363616 A1 | 11/2022 | Slivensky et al. |
| 2022/0363862 A1 | 11/2022 | Slivensky et al. |
| 2022/0363996 A1 | 11/2022 | Wu et al. |
| 2022/0380328 A1 | 12/2022 | Slivensky et al. |
| 2022/0380680 A1 | 12/2022 | Slivensky et al. |
| 2022/0380683 A1 | 12/2022 | Slivensky et al. |
| 2022/0396546 A1 | 12/2022 | Slivensky et al. |
| 2022/0396736 A1 | 12/2022 | Wu et al. |
| 2022/0402845 A1 | 12/2022 | Slivensky et al. |
| 2022/0402860 A1 | 12/2022 | Slivensky et al. |
| 2022/0403053 A1 | 12/2022 | Slivensky et al. |

FOREIGN PATENT DOCUMENTS

| | | |
|---|---|---|
| CN | 1609169 A | 4/2005 |
| CN | 101948386 A | 1/2011 |
| CN | 102249909 A | 11/2011 |
| CN | 103664444 A | 3/2014 |
| CN | 105732354 A | 7/2016 |
| CN | 106008218 A | 10/2016 |
| CN | 107075094 A | 8/2017 |
| CN | 106496378 B1 | 8/2018 |
| CN | 109575978 B1 | 4/2019 |
| DE | 4412941 A1 | 10/1995 |
| EP | 0052419 A1 | 5/1982 |
| EP | 0094456 A1 | 5/1982 |
| EP | 0103810 A2 | 3/1984 |
| EP | 0114611 A2 | 8/1984 |
| EP | 0144745 A1 | 6/1985 |
| EP | 0183545 A1 | 11/1985 |
| EP | 0189247 A1 | 7/1986 |
| EP | 0225143 A2 | 6/1987 |
| EP | 0285415 A2 | 3/1988 |
| EP | 0307907 A2 | 9/1988 |
| EP | 0648829 A1 | 10/1994 |
| EP | 0804398 A1 | 11/1997 |
| EP | 1004563 B1 | 11/1999 |
| EP | 1732871 B1 | 1/2005 |
| EP | 3063122 A1 | 9/2016 |
| GB | 2106893 A | 4/1983 |
| JP | 09-157659 A | 6/1997 |
| JP | 2018-511671 A | 4/2018 |
| RU | 2162461 C1 | 1/2001 |
| WO | WO 93/04026 A1 | 3/1993 |
| WO | WO 97/41088 A1 | 11/1997 |
| WO | WO 98/12162 A1 | 3/1998 |
| WO | WO 01/05908 A1 | 1/2001 |
| WO | WO 2004/018584 A1 | 3/2004 |
| WO | WO 2004/018592 A1 | 3/2004 |
| WO | WO 2008/100566 A1 | 8/2008 |
| WO | WO 2010/060862 A1 | 6/2010 |
| WO | WO 2010/099058 A2 | 9/2010 |
| WO | WO 2012/099679 A1 | 7/2012 |
| WO | WO 2013/025186 A1 | 2/2013 |
| WO | WO 2013/037036 A1 | 3/2013 |
| WO | WO 2014/034015 A1 | 3/2014 |
| WO | WO 2014/051347 A1 | 4/2014 |
| WO | WO 2014/181248 A1 | 11/2014 |

(56) References Cited

FOREIGN PATENT DOCUMENTS

| WO | WO 2015/000840 A1 | 1/2015 |
| --- | --- | --- |
| WO | WO 2015/104430 A1 | 7/2015 |
| WO | WO 2016/069622 A1 | 5/2016 |
| WO | WO 2016/134794 A1 | 9/2016 |
| WO | WO 2016/142809 A1 | 9/2016 |
| WO | WO 2017/027271 A1 | 2/2017 |
| WO | WO 2017/146876 A1 | 8/2017 |
| WO | WO 2018/005074 A1 | 1/2018 |
| WO | WO 2018/011642 A1 | 1/2018 |
| WO | WO 2018/024796 A1 | 2/2018 |
| WO | WO 2018/025103 A1 | 2/2018 |
| WO | WO 2018/069794 A1 | 4/2018 |
| WO | WO 2018/104443 A1 | 6/2018 |
| WO | WO 2018/127813 A1 | 7/2018 |
| WO | WO 2018/160588 A1 | 9/2018 |
| WO | WO 2019/019539 A1 | 1/2019 |
| WO | WO 2020/152317 A1 | 7/2020 |
| WO | WO 2020/152320 A1 | 7/2020 |
| WO | WO 2020/252228 A1 | 12/2020 |
| WO | WO 2021/087026 A1 | 5/2021 |
| WO | WO 2021/133889 A1 | 7/2021 |
| WO | WO 2021/133893 A1 | 7/2021 |
| WO | WO 2021/133895 A1 | 7/2021 |

OTHER PUBLICATIONS

USPTO Office Action dated Oct. 12, 2023 received in co-pending U.S. Appl. No. 17/755,326.
Co-pending U.S. Appl. No. 17/755,327, filed Apr. 27, 2022; Wu et al.
USPTO Office Action dated Jun. 6, 2023 received in co-pending U.S. Appl. No. 17/755,327.
USPTO Office Action dated Jan. 23, 2024 received in co-pending U.S. Appl. No. 17/755,327.
USPTO Office Action dated Jul. 1, 2024 received in co-pending U.S. Appl. No. 17/755,327.
Co-pending U.S. Appl. No. 17/595,511, filed Nov. 18, 2021; Bitting et al.
USPTO Office Action dated Jul. 30, 2024 received in co-pending U.S. Appl. No. 17/595,511.
Co-pending U.S. Appl. No. 17/595,512, filed Nov. 18, 2021; Bitting et al.
USPTO Office Action dated Feb. 24, 2023 received in co-pending U.S. Appl. No. 17/595,512.
Notice of Allowance dated Sep. 27, 2023 received in co-pending U.S. Appl. No. 17/595,512.
Notice of Allowance dated Feb. 9, 2024 received in co-pending U.S. Appl. No. 17/595,512.
Co-pending U.S. Appl. No. 17/083,586, filed Mar. 20, 2024; Bitting et al.
Co-pending U.S. Appl. No. 18/610,557 filed on Octob; Bitting et al.
USPTO Office Action dated Sep. 16, 2021 received in co-pending U.S. Appl. No. 17/083,586.
USPTO Office Action dated May 25, 2022 received in co-pending U.S. Appl. No. 17/083,586.
USPTO Office Action dated Nov. 10, 2022 received in co-pending U.S. Appl. No. 17/083,586.
USPTO Office Action dated Mar. 31, 2023 received in co-pending U.S. Appl. No. 17/083,586.
Notice of Allwance dated Feb. 14, 2024 received in co-pending U.S. Appl. No. 17/083,586.
Co-pending U.S. Appl. No. 18/610,459, filed Mar. 20, 2024; Bitting et al.
Co-pending U.S. Appl. No. 17/595,514, filed Nov. 18, 2021; Slivensky et al.
USPTO Office Action dated Feb. 28, 2023 received in co-pending U.S. Appl. No. 17/595,514.
Notice of Allowance dated Apr. 15, 2024 received in co-pending U.S. Appl. No. 17/595,514.
Co-pending U.S. Appl. No. 17/594,966, filed Nov. 4, 2021; Slivensky et al.
Co-pending U.S. Appl. No. 17/595,565, filed Nov. 19, 2021; Slivensky et al.
Co-pending U.S. Appl. No. 17/755,638, filed May 4, 2022; Slivensky et al.
Co-pending U.S. Appl. No. 17/755,341, filed Apr. 27, 2022; Slivensky et al. Publication No. 2022-0380328.
Co-pending U.S. Appl. No. 17/755,345, filed Apr. 27, 2022; Slivensky et al.
Co-pending U.S. Appl. No. 17/595,515, filed Nov. 18, 2021; Slivensky et al.
USPTO Office Action dated Jun. 3, 2024 received in co-pending U.S. Appl. No. 17/595,515.
Co-pending U.S. Appl. No. 17/597,822, filed Jan. 25, 2022; Slivensky et al.
USPTO Office Action dated May 20, 2024 received in co-pending U.S. Appl. No. 17/597,822.
Co-pending U.S. Appl. No. 17/755,349, filed Apr. 27, 2022; Slivensky et al.
Co-pending U.S. Appl. No. 17/755,351, filed Apr. 27, 2022; Slivensky et al.
Co-pending U.S. Appl. No. 17/755,357, filed Apr. 27, 2022; Slivensky et al.
Co-pending U.S. Appl. No. 17/597,817, filed Jan. 25, 2022; Slivensky et al.
Co-pending U.S. Appl. No. 17/597,726, filed Jan. 20, 2022; Slivensky et al.
Co-pending U.S. Appl. No. 17/755,628, filed May 4, 2022; Slivensky et al.
USPTO Office Action dated Jul. 25, 2023 received in co-pending U.S. Appl. No. 17/755,628.
USPTO Notice of Allowance dated Aug. 21, 2024, received in co-pending U.S. Appl. No. 17/755,628.
Co-pending U.S. Appl. No. 17/755,634, filed May 4, 2022; Slivensky et al.
Co-pending U.S. Appl. No. 17/755,627, filed May 4, 2022; Slivensky et al.
USPTO Office Action dated Jun. 29, 2023 received in co-pending U.S. Appl. No. 17/755,627.
USPTO Notice of Allowance dated Feb. 9, 2024 received in co-pending U.S. Appl. No. 17/755,627.
Co-pending U.S. Appl. No. 18/610,421, filed Mar. 20, 2024; Slivensky et al.
Co-pending U.S. Appl. No. 17/090,976, filed Nov. 6, 2020; Slivensky et al.
Co-pending U.S. Appl. No. 17/083,590, filed Oct. 29, 2020; Wu et al.
USPTO Office action dated Jul. 1, 2021 received in co-pending U.S. Appl. No. 17/083,590.
USPTO Notice of Allowance dated Mar. 17, 2022 received in co-pending U.S. Appl. No. 17/083,590.
Co-pending U.S. Appl. No. 17/657,978, filed Apr. 5, 2022; Wu et al.
USPTO Office Action dated Oct. 25, 2022 received in c-pending U.S. Appl. No. 17/657,978.
USPTO Office Action dated May 18, 2023 received in co-pending U.S. Appl. No. 17/657,978.
USPTO Notice of Allowance dated Aug. 29, 2023 received in co-pending U.S. Appl. No. 17/657,978.
Co-pending U.S. Appl. No. 17/995,718, filed Oct. 7, 2022; DeBruin et al.
Co-pending U.S. Appl. No. 17/995,717, filed Oct. 7, 2022; DeBruin et al.
Co-pending U.S. Appl. No. 17/995,716, filed Oct. 7, 2022; DeBruin et al.
Co-pending U.S. Appl. No. 17/995,715, filed Oct. 7, 2022; DeBruin et al.
Shelton, Michael C.; "Cellulose Esters, Inorganic Esters", Kirk-Othmer, Encyclopedia of Chemical Technology, 5th edition, vol. 5, Wiley Interscience, New York (2004), pp. 394-412.
Gedon, Steven, et al.; "Cellulose Esters, Organic Esters", Kirk-Othmer, Encyclopedia of Chemical Technology, 5th edition, vol. 5, Wiley Interscience, New York (2004), pp. 412-444.

(56) References Cited

OTHER PUBLICATIONS

Wade, Bruce; "Vinyl Acetal Polymers"; Encyclopdia of Polymer Science & Technology, 3rd edition, vol. 8, pp. 381-399 (2003).
Riesel, L., et al.; "A Simple Synthesis of Fluoro(organyl)phosphnes", Z. Anorg. Allg. Chem., 603, (1991), pp. 145-150.
Tullock, C.W., et al.; "Synthesis of Fluorides by Metathesis with Sodium Fluoride"; Journal of Organic Chemistry, vol. 25 (1960), pp. 2016-2019.
Li, Fuwei et al.; Production of light olefins from catalytic cracking bio-oil model compounds over La2O3-modified ZSM-5 zeolite; Energy Fuels, 2018, 32, pp. 5910-5922.
White, D.W., et al.; "Structural Implications of Nuclear Magentic Resonance Studies n 1-R-1-Phospha-2,6-dioxacyclohexanes"; Journal of the American Chemical Society, 92:24, Dec. 2, 1970, pp. 7125-7135.
Dwidar, Mohammed et al.; "The Future of Butyric Acid in Industry"; The Scientific World Journal, vol. 2012, Article ID 471417, 9 pages.
Sogancioglu, Merve et al.; "A Comparative Study on Waste Plastics Pyrolysis Liquid Products Quantity and Energy Recovery Potential"; Energy Procedia 188 (2017) 221-226.
Zhang, L et al.: "Alcohol Stabilization of Low Water Content Pyrolysis Oil during High Temperature Treatment"; Energy Fuels, 2017, vol. 31, oages 13666-13674.
Thunman, Henrik et al.; "Circular use of plastics-transformation of existing petrochemical clusters into thermochemical recycling plants with 100% plastics recovery"; Sustainable Materials and Technologies 22 (2019) e00124;.
Liang, Guanfeng et al.; Production of Primary Amines by Reductive Amination of Biomass-Derived Aldehydes/Ketones; Agnew. Chem. 2017, vol. 129, pp. 3096-3100.
Meyer, Thomas G., et al.; "Preparations and Single Crystal X-ray Diffraction Study of Some Fluorophosphites and Phosphite Esters"; Z Naturforsch, 48b, pp. 659-671 (1993).
ASTM D2887 "Standard Test Method for Boiling Range Distribution of Petroleum Fractions by Gas Chromatography"; Published Jan. 2020.
ASTMD5399 "Standard Test Method for Boiling Point Distribution of Hydrocarbon Solvents by Gas Chromatography"; Published Dec. 2017.
ASTM D6474 "Standard Test Method for Determining Molecular Weight Distribution and Molecular Weight Averages of Polyolefins by High Temperature Gel Permeation Chromatography" Published Apr. 2020.
ASTM D5296 "Standard Test Method for Molecular Weight Averages and Molecular Weight Distribution of Polystyrene by High Performance Size-Exclusion Chromatography" Published Dec. 2019.
ASTM E308 "Standard Practice for Computing the Colors of Objects by Using the CIE System" Published Sep. 2018.
ASTM E794 Standard Test Method for Melting and Crystallization Temperatures By Thermal Analysis; Published May 2018.
ASTM D6290 "Standard Test Method for Color Determination of Plastic Pellets" Published Jun. 2019.
ASTM D790 "Standard Test Methods for Flexural Properties of Unreinforced and Reinforced Plastics and Electrical Insulating Materials" Published Jul. 2017.
ASTM D256 "Standard Test Methods for Determining the Izod Pendulum Impact Resistance of Plastics" Published Nov. 2018.
ASTMD3418 "Standard Test Method for Transition Temperatures and Enthalpies of Fusion and Crystallization of Polymers by Differential Scanning Calorimetry" Published Jun. 2015.
ASTM D1003 "Standard Test Method for Haze and Luminous Transmittance of Transparent Plastics" Published Nov. 2013.
ASTM D648 "Standard Test Method for Deflection Temperature of Plastics Under Flexural Load in the Edgewise Position" Published Apr. 2018.
ASTM D6440 "Standard Test Method for Plastics: Dynamic Mechanical Properties Melt Rheology" Published Feb. 2015.

Notification of Transmittal of the International Search Report and the Written Opinion of the International Searching Authority with Date of Mailing Feb. 22, 2021 for International Application No. PCT/US2020/057873.
Notification of Transmittal of the International Search Report and the Written Opinion of the International Searching Authority with Date of Mailing Feb. 23, 2021 for International Application No. PCT/US2020/057876.
Notification of Transmittal of the International Search Report and the Written Opinion of the International Searching Authority with Date of Mailing Sep. 9, 2020 for International Application No. PCT/US2020/034151.
Notification of Transmittal of the International Search Report and the Written Opinion of the International Searching Authority with Date of Mailing Sep. 9, 2020 for International Application No. PCT/US2020/034139.
Notification of Transmittal of the International Search Report and the Written Opinion of the International Searching Authority with Date of Mailing Aug. 27, 2020 for International Application No. PCT/US2020/034147.
Notification of Transmittal of the International Search Report and the Written Opinion of the International Searching Authority with Date of Mailing Sep. 4, 2020 for International Application No. PCT/US2020/034166.
Notification of Transmittal of the International Search Report and the Written Opinion of the International Searching Authority with Date of Mailing Sep. 4, 2020 for International Application No. PCT/US2020/034170.
Notification of Transmittal of the International Search Report and the Written Opinion of the International Searching Authority with Date of Mailing Sep. 4, 2020 for International Application No. PCT/US2020/034167.
Notification of Transmittal of the International Search Report and the Written Opinion of the International Searching Authority with Date of Mailing Feb. 26, 2021 for International Application No. PCT/US2020/059310.
Notification of Transmittal of the International Search Report and the Written Opinion of the International Searching Authority with Date of Mailing Apr. 19, 2021 for International Application No. PCT/US2020/059316.
Notification of Transmittal of the International Search Report and the Written Opinion of the International Searching Authority with Date of Mailing Mar. 5, 2021 for International Application No. PCT/US2020/059324.
Notification of Transmittal of the International Search Report and the Written Opinion of the International Searching Authority with Date of Mailing Sep. 4, 2020 for International Application No. PCT/US2020/034172.
Notification of Transmittal of the International Search Report and the Written Opinion of the International Searching Authority with Date of Mailing Nov. 11, 2020 for International Application No. PCT/US2020/043944.
Notification of Transmittal of the International Search Report and the Written Opinion of the International Searching Authority with Date of Mailing Mar. 8, 2021 for International Application No. PCT/US2020/059327.
Notification of Transmittal of the International Search Report and the Written Opinion of the International Searching Authority with Date of Mailing Feb. 26, 2021 for International Application No. PCT/US2020/059282.
Notification of Transmittal of the International Search Report and the Written Opinion of the International Searching Authority with Date of Mailing Feb. 25, 2021 for International Application No. PCT/US2020/059286.
Notification of Transmittal of the International Search Report and the Written Opinion of the International Searching Authority with Date of Mailing Nov. 9, 2020 for International Application No. PCT/US2020/043948.
Notification of Transmittal of the International Search Report and the Written Opinion of the International Searching Authority with Date of Mailing Nov. 6, 2020 for International Application No. PCT/US2020/043956.

(56) References Cited

OTHER PUBLICATIONS

Notification of Transmittal of the International Search Report and the Written Opinion of the International Searching Authority with Date of Mailing Apr. 12, 2021 for International Application No. PCT/US2020/059302.

Notification of Transmittal of the International Search Report and the Written Opinion of the International Searching Authority with Date of Mailing Feb. 26, 2021 for International Application No. PCT/US2020/059292.

Notification of Transmittal of the International Search Report and the Written Opinion of the International Searching Authority with Date of Mailing Mar. 31, 2021 for International Application No. PCT/US2020/059306.

Notification of Transmittal of the International Search Report and the Written Opinion of the International Searching Authority with Date of Mailing Aug. 2, 2021 for International Application No. PCT/US2021/027003.

Notification of Transmittal of the International Search Report and the Written Opinion of the International Searching Authority with Date of Mailing Jul. 30, 2021 for International Application No. PCT/US2021/027016.

Notification of Transmittal of the International Search Report and the Written Opinion of the International Searching Authority with Date of Mailing Aug. 2, 2021 for International Application No. PCT/US2021/027021.

Notification of Transmittal of the International Search Report and the Written Opinion of the International Searching Authority with Date of Mailing Jul. 30, 2021 for International Application No. PCT/US2021/026998.

Notification of Transmittal of the International Search Report and the Written Opinion of the International Searching Authority with Date of Mailing Aug. 22, 2022 for International Application No. PCT/US2022/026723.

The Editors of Encyclopedia Britannica; "Cracking—Chemical Process"; https://web.archive.org/web/20160629203035/https://www.britannica.com/technology/cr acking-chemical-process; Publication Date Jun. 29, 2016.

The Editors of Encyclopedia Britannica; "Pyrolysis—Chemical Reaction"; https://web.archibe.org/web/20160611215925/https://www.britannica.com/science/pyrol ysis; Published Jun. 11, 2016.

The Editors of Encyclopedia Britannica; "Hydrotreating—Chemical Process"; https://web/archive.org/web/201509151105414/https://www.britannica.com/technology/ hydrotreating; Published Sep. 15, 2015.

Scheirs, John et al.; "Feedstock Recycling and Pyrolysis of Waste Plastics"; Wiley Series in Polymer Science; Chapter 13, p. 345-361, (2006).

PCT Third Party Observation with Submission Date of Sep. 28, 2021 for International Application No. PCT/US2020/034166.

PCT Third Party Observation with Submission Date of Sep. 24, 2021 for International Application No. PCT/US2020/034172.

PCT Third Party Observation with Submission Date of Sep. 24, 2021 for International Application No. PCT/US2020/034151.

PCT Third Party Observation with Submission Date of Sep. 24, 2021 for International Application No. PCT/US2020/034147.

PCT Third Party Observation with Submission Date of Sep. 24, 2021 for International Application No. PCT/US2020/034139.

Paben, Jared; "Pyrolysis firm unveils recycled chemicals to make olefins"; https://resource-recycling.com/plastics/2018/09/06/pyrolysis-firm-unveils-recycled- chemicals-to-make-olefins/; Published Sep. 6, 2018.

Miandad, Rashid et al.; "Catalytic Pyrolysis of Plastic Waste: Moving Toward Pyrolysis Based Biorefineries"; Frontiers in Energy Research, vol. 7m Article 27, pp. 1-17, Published Mar. 19, 2019.

Laermann, Michael; Chemical Recycling of Plastic Waste No More ?; https://sustainablebrands.com/read/chemistry-materials-packaging/chemical-recycling-of-plastic-waste-no-more; Published Apr. 10, 2019.

Ellen Macarthur Foundation and CE100; "Driving circular economy with the mass balance approach: BASF joins forces with members of the Ellen Macarthur Foundation's CE100 network for White Paper Publication"; https://www.basf.com/us/en/who-we-are/sustainability/whats-new/sustainability-news/2019/EllenMacArthurfoundation-White_Paper-Mass-balance.html; Published May 10, 2019.

"ISCC 203 - Traceability and Chain of Custody"; https://www.iscc-system.org/wp- content/uploads/2017/02/ISCC_203_Traceability_and_Chain-of-Custody_3.0.pdf; Published Aug. 9, 2016.

"BASF for the first time makes products with chemically recycled plastics"; https://www.basf.com/us/en/media/news-releases/2018/12/P-US-18-134.html; Published Dec. 13, 2018.

European Search Report for Application No. 20818530.6 dated Apr. 18, 2023.

European Search Report for Application No. 20812637.5 Dated Apr. 6, 2023.

European Search Report for Application No. 20812640.9 Dated Apr. 19, 2023.

European Search Report for Application No. 20812751.4 Dated Jun. 2, 2023.

European Search Report for Application No. 20847380.1 Dated Jul. 4, 2023.

European Search Report for Application No. 20847233.2 Dated Aug. 4, 2023.

European Search Report for Application No. 20846364.6 Dated Jul. 28, 2023.

European Search Report for Application No. 20882420.1 Dated Nov. 24, 2023.

European Search Report for Application No. 20882499.5 Dated Nov. 24, 2023.

European Search Report for Application No. 20885421.6 Dated Jan. 23, 2024.

European Search Report for Application No. 21787871.9 Dated Apr. 12, 2024.

European Search Report for Application No. 21789287.6 dated Jun. 6, 2024.

European Search Report for Application No. 21788019.4dated Jul. 22, 2024.

Banerjee, D.K., 2019 "Thermal Processing of Hydrocarbons: Petroleum to Petrochemicals"; PennWell, 160, pp. 108 & 109.

\* cited by examiner

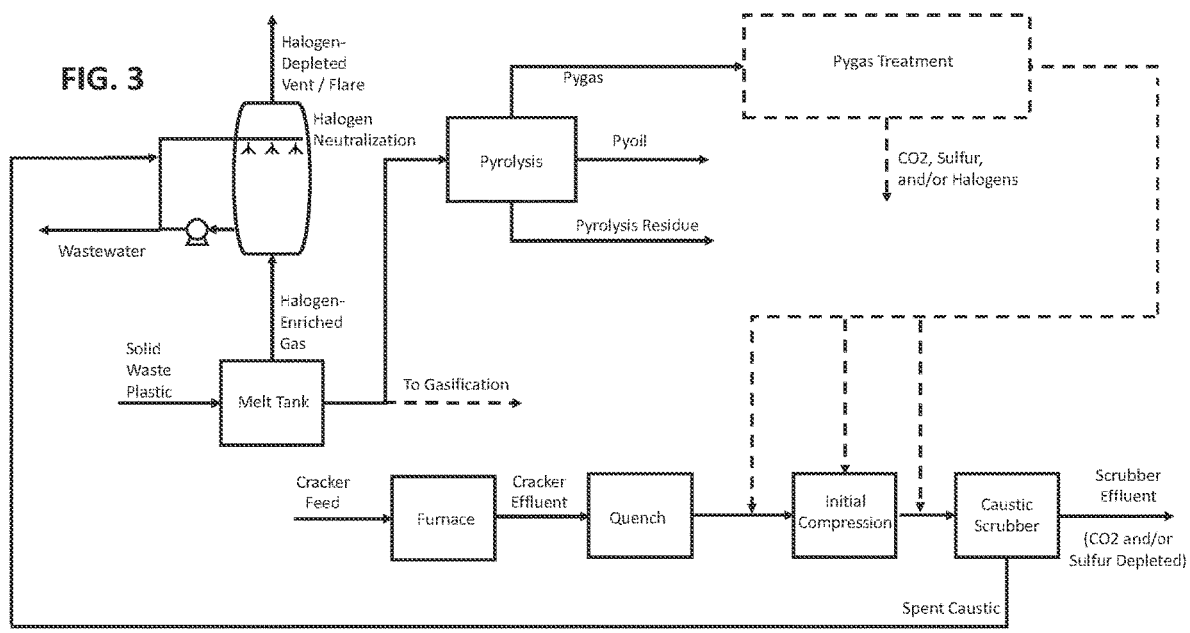

USING SPENT CAUSTIC SOLUTION FROM PYGAS TREATMENT TO NEUTRALIZE HALOGENS FROM LIQUIFIED WASTE PLASTIC

CROSS REFERENCE TO RELATED APPLICATIONS

This application claims priority to U.S. Provisional Application Ser. No. 63/261,432 filed Sep. 21, 2021, the disclosure of which is herein incorporated by reference in its entirety.

BACKGROUND

Waste plastic pyrolysis and gasification play a part in a variety of chemical recycling technologies. In many cases, the waste plastic is melted or otherwise liquified prior to being fed to the pyrolysis or gasification process. However, this liquefaction process will generate gasses, which may be enriched in halogens (e.g., HCl), particularly when halogen-containing plastics are subjected to the liquefaction process. The halogen-enriched gas stream must be treated to remove the halogens before being vented or flared. A neutralization process may be used, such as a caustic scrubber process. Traditionally, the caustic scrubber process requires preparing a dedicated caustic solution stream for the halogen neutralization process, increasing capital and operational costs.

SUMMARY

In one aspect, the present technology concerns a chemical recycling process comprising: (a) introducing a solid waste plastic into a liquefaction process and producing a liquified waste plastic and a halogen-enriched gaseous material; (b) pyrolyzing at least a portion of the liquified waste plastic to thereby produce a pyrolysis effluent comprising a pyrolysis gas (pygas) and a pyrolysis oil (pyoil); (c) separating at least a portion of the pyrolysis effluent to produce a pygas stream and a pyoil stream; (d) introducing at least a portion of the pygas stream into a first caustic scrubber process and producing at least a carbon dioxide ($CO_2$) and/or sulfur-depleted scrubber effluent stream and a spent caustic stream; and (e) scrubbing at least a portion of the halogen-enriched gaseous material in a second caustic scrubber process using at least a portion of the spent caustic stream to thereby produce a halogen-depleted gas stream and a wastewater stream.

In one aspect, the present technology concerns a chemical recycling process comprising: (a) introducing a solid waste plastic into a liquefaction process and producing a liquified waste plastic and a halogen-enriched gaseous material; (b) introducing a feedstock comprising at least a portion of a cracker furnace effluent into a first caustic scrubber process and thereby producing at least a carbon dioxide ($CO_2$) and/or sulfur-depleted effluent stream and a spent a spent caustic stream; and (c) scrubbing at least a portion of the halogen-enriched gaseous material in a second caustic scrubber process using at least a portion of the spent caustic stream to thereby produce a halogen-depleted gas stream and a wastewater stream.

In one aspect, the present technology concerns a chemical recycling process comprising: (a) introducing a solid waste plastic into a liquefaction process and producing a liquified waste plastic and a halogen-enriched gaseous material; and (b) scrubbing at least a portion of the halogen-enriched gaseous material in a caustic scrubbing process using a spent caustic stream to thereby produce a halogen-depleted gas stream and a wastewater stream.

BRIEF DESCRIPTION OF THE DRAWINGS

FIG. 3 is a block flow diagram illustrating the recycling of a spent caustic stream from a first caustic scrubber process to be used as caustic for a second caustic scrubber process.

DETAILED DESCRIPTION

We have discovered new methods and systems utilizing a spent caustic stream from a first caustic scrubber process as the caustic solution supply for a second caustic scrubber process. More specifically, we have discovered that the spent caustic solution from a scrubber process used to treat at least a portion of a cracker furnace and/or pyrolysis gas effluent may be recovered and recycled for use as caustic solution in a halogen (e.g., HCl) neutralization process. In particular, the spent caustic solution recovered from the cracker facility caustic scrubber may be recycled to a second caustic scrubber process to remove HCl from a gaseous material produced by waste plastic liquefaction.

As used herein, the term "recycled content" refers to being or comprising a composition that is directly and/or indirectly derived from recycled material, for example recycled waste plastic. Throughout this description, various recycled content components may be denoted by "r-[component]." However, it should be understood that any component that is directly and/or indirectly derived from recycled material may be considered a recycled content component, regardless whether the denotation is used.

Figure 1:
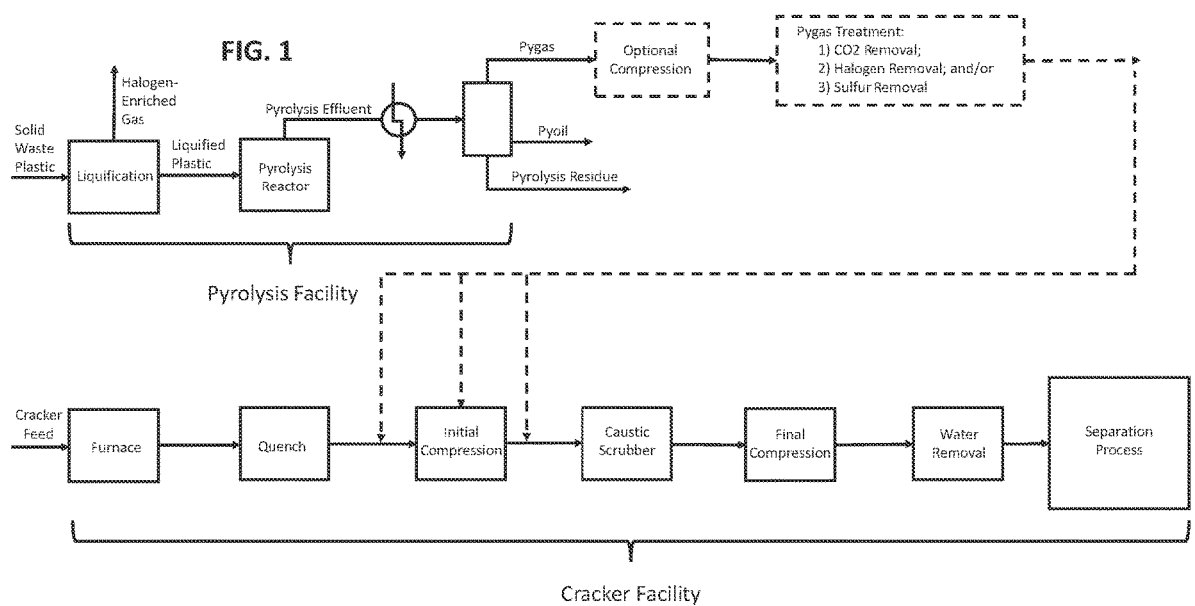
FIG. 1 is a block flow diagram illustrating the main steps of a chemical recycling process for producing recycled chemical products and coproducts.

FIG. 1 illustrates one embodiment of a process and system for use in chemical recycling of waste plastic. The process shown in FIG. 1 includes a pyrolysis facility and a cracking facility. The pyrolysis facility and cracking facility may be co-located or located remotely from one another. As used herein, the term "co-located" refers to the characteristic of at least two objects being situated on a common physical site, and/or within 0.5 or 1 mile of each other. As used herein, the term "located remotely" refers to a distance of greater than 1, greater than 5, greater than 10, greater than 50, greater than 100, greater than 500, greater than 1000, or greater than 10,000 miles between two facilities, sites, or reactors.

When two or more facilities are co-located, the facilities may be integrated in one or more ways. Examples of integration include, but are not limited to, heat integration, utility integration, waste-water integration, mass flow integration via conduits, office space, cafeterias, integration of plant management, IT department, maintenance department, and sharing of common equipment and parts, such as seals, gaskets, and the like.

In some embodiments, the pyrolysis facility/process is a commercial scale facility/process receiving the waste plastic feedstock at an average annual feed rate of at least 100, or at least 500, or at least 1,000, at least 2,000, at least 5,000, at least 10,000, at least 50,000, or at least 100,000 pounds per hour, averaged over one year. Further, the pyrolysis facility can produce the r-pyoil and r-pygas in combination at an average annual rate of at least 100, or at least 1,000, or at least 5,000, at least 10,000, at least 50,000, or at least 75,000 pounds per hour, averaged over one year.

Similarly, the cracking facility/process can be a commercial scale facility/process receiving hydrocarbon feed at an average annual feed rate of at least at least 100, or at least 500, or at least 1,000, at least 2,000, at least 5,000, at least 10,000, at least 50,000, or at least 75,000 pounds per hour, averaged over one year. Further, the cracking facility can produce at least one recycled content product stream (r-product) at an average annual rate of at least 100, or at least 1,000, or at least 5,000, at least 10,000, at least 50,000, or at least 75,000 pounds per hour, averaged over one year. When more than one r-product stream is produced, these rates can apply to the combined rate of all r-products and r-coproducts.

As shown in FIG. 1, the process begins by feeding the waste plastic to a pyrolysis facility. In some embodiments, the waste plastic comprises at least 80, at least 90, at least 95, at least 99, or at least 99.9 percent by weight polyolefins. In some embodiments, the waste plastic comprises not more than 10, not more than 5, not more than 1, not more than 0.5, not more than 0.3, not more than 0.2, or not more than 0.1 percent by weight polyesters (e.g., PET). Such low levels of polyesters, such as PET, can be desirable so as to avoid formation of formic acid, acetic acid, others that can cause corrosive compounds to build up in downstream processes. In some embodiments, the waste plastic comprises not more than 0.1 percent by weight polyvinyl chloride (PVC). However, in some embodiments greater content of chloride and/or other halogens may be present in the waste plastic, for example, if one or more halogen removal processes are utilized in downstream processing, as described herein.

In some embodiments, the pyrolysis facility comprises a liquification zone for liquifying at least a portion of the waste plastic feed. The liquification zone may generally include a process comprising the following steps: (i) liquefying the solid waste plastic to produce a liquefied waste plastic; (ii) introducing a stripping gas into the liquefied waste plastic to produce a multi-phase mixture; and (iii) disengaging a gaseous phase from a liquid phase of the multi-phase mixture to thereby provide a halogen-enriched gaseous material and a liquefied waste plastic. The liquification zone may comprise a process for liquefying the waste plastic by one or more of: (i) heating/melting; (ii) dissolving in a solvent; (iii) depolymerizing; (iv) plasticizing, and combinations thereof. Additionally, one or more of options (i) through (iv) may also be accompanied by the addition of a blending agent to help facilitate the liquification (reduction of viscosity) of the polymer material.

In some embodiments, the liquification zone includes a melt tank system comprising one or more melt tanks, one or more heaters, one or more stripping columns, and one or more disengagement vessels. The melt tank(s) receive the waste plastic feed and the heater(s) heat the waste plastic stream. The melt tank(s) can include one or more continuously stirred tanks. When one or more rheology modification agents (e.g., solvents, depolymerization agents, plasticizers, and blending agents) are used in the liquification zone, such rheology modification agents can be added to and/or mixed with the waste plastic in the melt tank. The heater of the liquification zone can take the form of internal heat exchange coils located in the melt tank and/or an external heat exchanger. The heater may transfer heat to the waste plastic via indirect heat exchange with a process stream or heat transfer medium. In some embodiments, the melt tank system (including one or more of the melt tanks contained therein) the melt tank is maintained at a temperature of 200 to 500° C.

In some embodiments, at least a portion of the pyrolysis oil stream produced in the pyrolysis facility (described below) may be recycled back to the melt tank system in order to provide pyrolysis oil to the melt tank system, where the pyrolysis oil may function as a dissolution solvent. Additionally, or alternatively, another dissolution solvent may be added to the melt tank system.

While in the melt tank system, at least a portion of the solid waste plastic may be heated above its melting temperature and/or glass transition temperature to thereby form a liquefied (i.e., molten) waste plastic. Furthermore, while in the melt tank system, at least a portion of the halogens present in the waste plastic feed can be removed. More particularly, the liquification system can contain equipment for removing halogens from the waste plastic feed stream. For example, when the waste plastic is heated in the melt tank system, halogen enriched gases can evolve. The evolved halogen-enriched gases may be disengaged from the resulting liquified plastic material, which results in a liquefied (i.e., molten) plastic stream with a reduced halogen content. As shown in FIG. 3, the resulting dehalogenated (i.e., halogen-depleted) liquefied waste plastic may then be introduced into downstream processing facilities, such as a pyrolysis facility or a gasification (PDX) facility, while the halogen-enriched gas may be vented or flared. However, before being vented or flared, the halogen-enriched gaseous material may be subjected to a halogen neutralization process, such as a caustic scrubber process, as described herein.

In some embodiments, dehalogenation of the liquefied plastic stream can be promoted by sparging a stripping gas (e.g., steam) into the liquified plastic material when the liquefied plastic is introduced and present in the one or more stripper columns. The stripping gas can comprise, for example, nitrogen, steam, methane, carbon monoxide, natural gas, and/or hydrogen. In particular embodiments, the stripping gas can comprise steam. The sparging of a stripping gas into the liquified plastic can create a two-phase medium in the stripper, which can then be flowed (e.g., by gravity) through a disengagement vessel, where a halogen-enriched gaseous phase is disengaged from a halogen-depleted liquid phase. Alternatively, a portion of the heated liquefied plastic may bypass the stripper and be introduced directly into the disengagement vessel. At least a portion of the halogen-depleted liquid phase can then be discharged from the liquification system as the liquified plastic stream, while the disengaged halogen-enriched gaseous stream can be removed from the liquification system for further processing and/or disposal. For example, as shown in FIG. 3, the halogen-enriched gaseous material may be treated in a halogen neutralization process, such as an HCl removal or caustic scrubber process, which is described in greater detail below.

In some embodiments, the liquified waste plastic stream exiting the liquification system can have a viscosity of less than 3,000, less than 2,500, less than 2,000, less than 1,500, less than 1,000, less than 800, less than 750, less than 700, less than 650, less than 600, less than 550, less than 500, less than 450, less than 400, less than 350, less than 300, less than 250, less than 150, less than 100, less than 75, less than 50, less than 40, less than 30, less than 25, less than 20, less than 10, less than 5, less than 4, less than 3, less than 2, or less than 1 poise and/or at least 0.1, at least 0.2, or at least 0.5 poise, as measured using a Brookfield R/S rheometer with V80-40 vane spindle operating at a shear rate of 10 rad/s and a temperature of 350° C. For example, the liquified waste plastic stream exiting the liquification system can have a viscosity of 0.1 to 3,000 poise, 0.1 to 800 poise, 0.1 to 500 poise, 0.1 to 250 poise, 0.1 to 75 poise, 0.1 to 50 poise, 0.1 to 10 poise, 0.1 to 5 poise, or 0.1 to 1 poise, as measured using a Brookfield R/S rheometer with V80-40 vane spindle operating at a shear rate of 10 rad/s and a temperature of 350° C. In some embodiments, the viscosity (measured at 350° C. and 10 rad/s and expressed in poise) of the liquified plastic stream exiting the liquification system is not more than 95, not more than 90, not more than 75, not more than 50, not more than 25, not more than 10, not more than 5, or not more than 1 percent of the viscosity of the waste plastic stream introduced into the liquification system.

In some embodiments, the halogen-depleted plastic exiting the liquification system can have a halogen content of not more than 1000, not more than 500, not more than 400, not more than 300, not more than 200, not more than 100, not more than 50, not more than 10, not more than 5, not more than 2, not more than 1, not more than 0.5, or not more than 0.1 ppm. The halogen content of the halogen-depleted liquified plastic stream exiting the liquification system can be not more than 95, not more than 90, not more than 75, not more than 50, not more than 25, not more than 10, or not more than 5 percent by weight of the halogen content of the waste plastic stream introduced into the liquification system.

Within the pyrolysis facility, the waste plastic or liquified waste plastic is fed to a pyrolysis step where the waste plastic is pyrolyzed in a pyrolysis reactor. The pyrolysis reaction involves chemical and thermal decomposition of the sorted waste plastic introduced into the reactor. Although all pyrolysis processes may be generally characterized by a reaction environment that is substantially free of oxygen, pyrolysis processes may be further defined, for example, by the pyrolysis reaction temperature within the reactor, the residence time in the pyrolysis reactor, the reactor type, the pressure within the pyrolysis reactor, and the presence or absence of pyrolysis catalysts. The pyrolysis reactor can be, for example, a film reactor, a screw extruder, a tubular reactor, a tank, a stirred tank reactor, a riser reactor, a fixed bed reactor, a fluidized bed reactor, a rotary kiln, a vacuum reactor, a microwave reactor, or an autoclave.

The pyrolysis reaction can involve heating and converting the waste plastic feedstock in an atmosphere that is substantially free of oxygen or in an atmosphere that contains less oxygen relative to ambient air. For example, the atmosphere within the pyrolysis reactor may comprise not more than 5, not more than 4, not more than 3, not more than 2, not more than 1, or not more than 0.5 weight percent of oxygen.

In one embodiment or in combination with one or more embodiments disclosed herein, the pyrolysis reaction performed in the pyrolysis reactor can be carried out at a temperature of less than 700° C., less than 650° C., or less than 600° C. and at least 300° C., at least 350° C., or at least 400° C. The feed to the pyrolysis reactor can comprise, consists essentially of, or consists of waste plastic. The feed stream, and/or the waste plastic component of the feed stream, can have a number average molecular weight (Mn) of at least 3000, at least 4000, at least 5000, or at least 6000 g/mole. If the feed to the pyrolysis reactor contains a mixture of components, the Mn of the pyrolysis feed is the weighted average Mn of all feed components, based on the mass of the individual feed components. The waste plastic in the feed to the pyrolysis reactor can include post-consumer waste plastic, post-industrial waste plastic, or combinations thereof. In certain embodiments, the feed to the pyrolysis reactor comprises less than 5, less than 2, less than 1, less than 0.5, or about 0.0 weight percent coal and/or biomass (e.g., lignocellulosic waste, switchgrass, fats and oils derived from animals, fats and oils derived from plants, etc.), based on the weight of solids in pyrolysis feed or based on the weight of the entire pyrolysis feed. The feed to the pyrolysis reaction can also comprise less than 5, less than 2, less than 1, or less than 0.5, or about 0.0 weight percent of a co-feed stream, including steam, sulfur-containing co-feed streams, and/or non-plastic hydrocarbons (e.g., non-plastic hydrocarbons having less than 50, less than 30, or less than 20 carbon atoms), based on the weight of the entire pyrolysis feed other than water or based on the weight of the entire pyrolysis feed. The reactor may also utilize a feed gas and/or lift gas for facilitating the introduction of the feed into the pyrolysis reactor. The feed gas and/or lift gas can comprise nitrogen and can comprise less than 5, less than 2, less than 1, or less than 0.5, or about 0.0 weight percent of steam and/or sulfur-containing compounds.

The temperature in the pyrolysis reactor can be adjusted to facilitate the production of certain end products. In some embodiments, the peak pyrolysis temperature in the pyrolysis reactor can be at least 325° C., or at least 350° C., or at least 375° C., or at least 400° C. Additionally or alternatively, the peak pyrolysis temperature in the pyrolysis reactor can be not more than 800° C., not more than 700° C., or not more than 650° C., or not more than 600° C., or not more than 550° C., or not more than 525° C., or not more than 500° C., or not more than 475° C., or not more than 450° C., or not more than 425° C., or not more than 400° C. More particularly, the peak pyrolysis temperature in the pyrolysis reactor can range from 325 to 800° C., or 350 to 600° C., or 375 to 500° C., or 390 to 450° C., or 400 to 500° C.

The residence time of the feedstock within the pyrolysis reactor can be at least 1, or at least 5, or at least 10, or at least 20, or at least 30, or at least 60, or at least 180 seconds. Additionally, or alternatively, the residence time of the feedstock within the pyrolysis reactor can be less than 2, or less than 1, or less than 0.5, or less than 0.25, or less than 0.1 hours. More particularly, the residence time of the feedstock within the pyrolysis reactor can range from 1 second to 1 hour, or 10 seconds to 30 minutes, or 30 seconds to 10 minutes.

The pyrolysis reactor can be maintained at a pressure of at least 0.1, or at least 0.2, or at least 0.3 barg and/or not more than 60, or not more than 50, or not more than 40, or not more than 30, or not more than 20, or not more than 10, or not more than 8, or not more than 5, or not more than 2, or not more than 1.5, or not more than 1.1 barg. The pressure within the pyrolysis reactor can be maintained at atmospheric pressure or within the range of 0.1 to 60, or 0.2 to 10, or 0.3 to 1.5 barg.

The pyrolysis reaction in the reactor can be thermal pyrolysis, which is carried out in the absence of a catalyst, or catalytic pyrolysis, which is carried out in the presence of a catalyst. When a catalyst is used, the catalyst can be homogenous or heterogeneous and may include, for example, certain types of zeolites and other mesostructured catalysts.

As shown in FIG. 1, a pyrolysis effluent is produced and removed from the reactor and generally comprises pyrolysis oil (pyoil), pyrolysis gas (pygas), and pyrolysis residue. As used herein, the terms "pyrolysis gas" or "pygas" refers to a composition obtained from waste plastic pyrolysis that is gaseous at 25° C. at 1 atm. As used herein, the terms "pyrolysis oil" or "pyoil" refers to a composition obtained from waste plastic pyrolysis that is liquid at 25° C. and 1 atm. As used herein, the term "pyrolysis residue" refers to a composition obtained from waste plastic pyrolysis that is not pygas or pyoil and that comprises predominantly pyrolysis char and pyrolysis heavy waxes. As used herein, the term "pyrolysis char" refers to a carbon-containing composition obtained from pyrolysis that is solid at 200° C. and 1 atm. As used herein, the term "pyrolysis heavy waxes" refers to C20+ hydrocarbons obtained from pyrolysis that are not pyrolysis char, pyrolysis gas, or pyrolysis oil.

In some embodiments, the pyrolysis effluent may comprise in the range of 20 to 99 weight percent, 25 to 80 weight percent, 30 to 85, 30 to 80, 30 to 75, 30 to 70, or 30 to 65 weight percent of the pyrolysis oil. In some embodiments, the pyrolysis effluent may comprise 1 to 90, 10 to 85, 15 to 85, 20 to 80, 25 to 80, 30 to 75, or 35 to 75 weight percent of the pyrolysis gas. In some embodiments, the pyrolysis effluent may comprise in the range of 0.1 to 25, 1 to 15, 1 to 8, or 1 to 5 weight percent of the pyrolysis residue.

In some embodiments, the pyrolysis effluent may comprise not more than 15, not more than 10, not more than 5, not more than 2, not more than 1, or not more than 0.5 weight percent of free water. As used herein, the term "free water" refers to water previously added to the pyrolysis unit and water generated in the pyrolysis unit.

The pyrolysis effluent generally leaves the pyrolysis reactor at very high temperatures (e.g., 500° C. to 800° C.) and thus must be cooled and at least partially condensed before being separated into respective pyrolysis gas, pyrolysis oil, and pyrolysis residue streams. The heat from the pyrolysis effluent can therefore be recovered and used in various processes throughout the chemical recycling process.

In some embodiments, the pyrolysis effluent stream is cooled to a temperature of not more than 60° C., or not more than 50° C. before being fed to the separator. In some embodiments, the pyrolysis effluent stream is cooled to a temperature of 15° C. to 60° C., 25° C. to 45° C., or 30° C. to 40° C. before being fed to the separator.

After cooling, the pyrolysis effluent stream may be fed to a separator to thereby produce a pyrolysis gas (pygas) stream, a pyrolysis (pyoil) stream, and a pyrolysis residue stream. In some embodiments, the pygas stream comprises 1 to 50 weight percent methane and/or 5 to 99 weight percent C2, C3, and/or C4 hydrocarbon content (including all hydrocarbons having 2, 3, or 4 carbon atoms per molecule). The pygas stream may comprise C2 and/or C3 components each in an amount of 5 to 60, 10 to 50, or 15 to 45 weight percent, C4 components in an amount of 1 to 60, 5 to 50, or 10 to 45 weight percent, and C5 components in an amount of 1 to 25, 3 to 20, or 5 to 15 weight percent. The pyrolysis gas may have a temperature of 15° C. to 60° C., 25° C. to 45° C., or 30° C. to 40° C. before treatment (described below).

In some embodiments, the pyoil stream comprises at least 50, at least 75, at least 90, or at least 95 weight percent of C4 to C30, C5 to C25, C5 to C22, or C5 to C20 hydrocarbon components. The pyoil can have a 90% boiling point in the range of from 150 to 350° C., 200 to 295° C., 225 to 290° C., or 230 to 275° C. As used herein, "boiling point" refers to the boiling point of a composition as determined by ASTM D2887-13. Additionally, as used herein, an "90% boiling point," refers to a boiling point at which 90 percent by weight of the composition boils per ASTM D-2887-13.

In some embodiments, the pyoil can comprise heteroatom-containing compounds in an amount of less than 20, less than 10, less than 5, less than 2, less than 1, or less than 0.5 weight percent. As used herein, the term "heteroatom-containing" compound includes any compound or polymer containing nitrogen, sulfur, or phosphorus. Any other atom is not regarded as a "heteroatom" for purposes of determining the quantity of heteroatoms, heterocompounds, or heteropolymers present in the pyoil. Heteroatom-containing compounds often include oxygenated compounds. Often, such compounds exist in r-pyoil when the pyrolyzed waste plastic includes polyethylene terephthalate (PET) and/or polyvinyl chloride (PVC). Thus, little to no PET and/or PVC in the waste plastic results in little to no heteroatom-containing compounds in the pyoil.

As shown in FIG. 1, the pygas stream from the pyrolysis effluent separator may be fed to an optional compression zone prior to being introduced to one or more pygas treatment processes. This optional compression zone may include one or more compressors, followed by one or more coolers, and/or a liquid knockout section. In some embodiments, the one or more pygas treatment processes comprise a carbon dioxide removal process, a halogen removal process, and/or a sulfur removal process.

In some embodiments, at least a portion of the pygas stream (treated or untreated) may be introduced into a caustic scrubber process, which may be located downstream of the treatment processes and/or in a cracker facility. The gas stream fed to the caustic scrubber may comprise the pygas stream, or the pygas stream may be combined with at least a portion of an effluent stream from a cracker furnace (described below), which may be in the form of a cracked gas stream, and the combined gas stream can be fed to the caustic scrubber.

The composition of the gas steam fed to the caustic scrubber will depend on factors such as the waste plastic composition, upstream treatment of the pygas stream and pygas stream composition, and whether the pygas is combined with a cracked gas. In some embodiments, the pygas stream (treated or untreated, combined or uncombined) introduced to the caustic scrubber comprises from 1 to 1000 ppm, 5 to 500 ppm, 10 to 300 ppm, or 50 to 200 ppm halogens; from 1 to 1000 pppw, 5 to 500 ppm, 10 to 200 ppm, 50 to 100 ppm hydrochloric acid (HCl); from 1 to 1000 ppm, 5 to 500 ppm, 10 to 200 ppm, or 50 to 100 ppm carbon dioxide ($CO_2$); and/or from 1 to 1000, 5 to 500, 10 to 200, or 50 to 100 ppm hydrogen sulfide ($H_2S$). The pygas stream (treated or untreated, combined or uncombined) may be introduced to the caustic scrubber process at a pressure of 100 psia to 300 psia.

Figure 2:
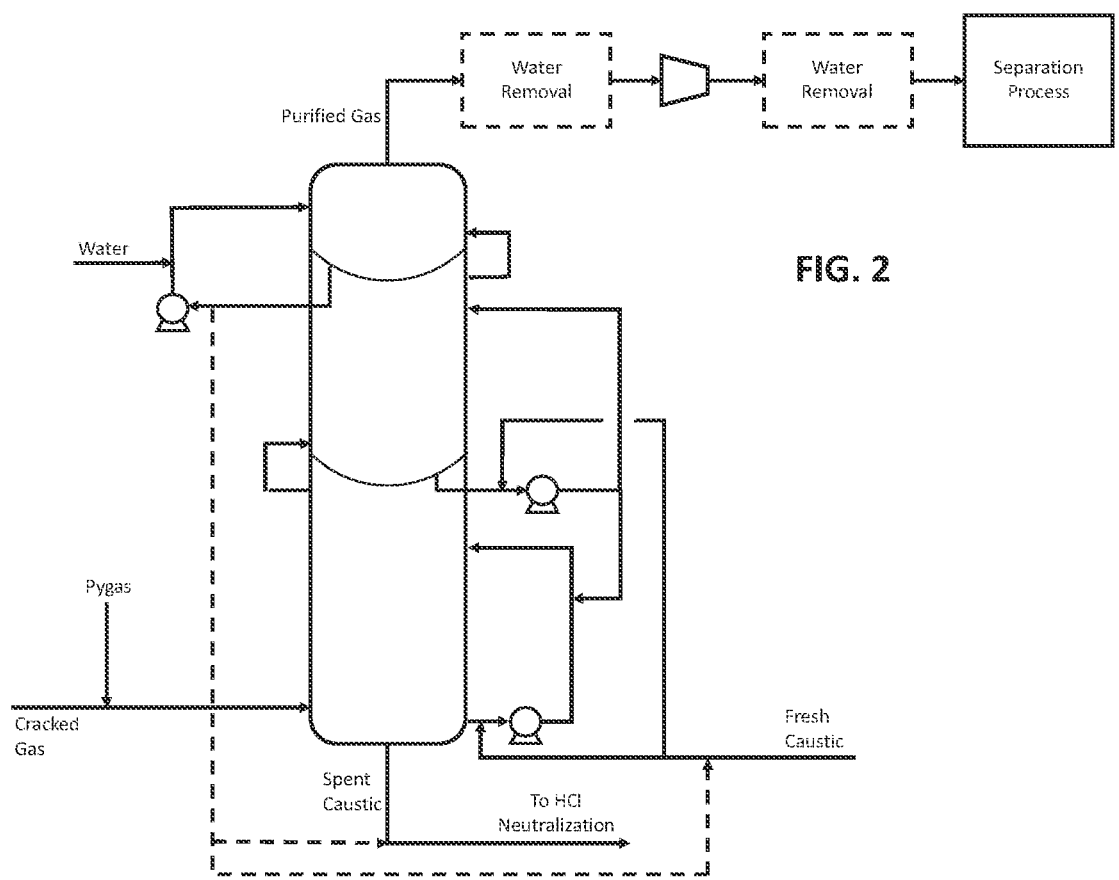
FIG. 2 is a flow diagram illustrating the main steps of a process for treating pyrolysis gas in a caustic scrubber system.

The caustic scrubber system may have a variety of designs and geometries, depending on factors such as gas flow rate and composition. An exemplary caustic scrubber process is shown in FIG. 2. The caustic scrubber shown is a three-stage scrubber, although the caustic scrubber can comprise two, three, four, five, or more stages. One or more of the stages may comprise packing material to increase the contact between the gas and liquid phases. In some embodiments, at least one stage is a water wash. In some embodiments, the last (top) stage is a water wash. In some embodiments, the caustic scrubber process operates at a temperature of 25° C. to 65° C.

The gas stream is fed to the bottom stage of the caustic scrubber tower above any liquid accumulated at the scrubber bottoms. Fresh caustic solution can be fed directly to any caustic stage. As the gas flows upward within and between stages, the gas contacts the caustic solution flowing downward, thereby transferring certain gaseous components (e.g., carbon dioxide) to the liquid caustic solution. In some embodiments, the caustic solution comprises a dissolved caustic component selected from the group consisting of sodium hydroxide, potassium hydroxide, calcium oxide, potassium carbonate, and combinations thereof. As noted above, the top stage can be an optional water section, which can remove residual caustic or salts in the gas stream. Additionally, the top water feed can be diverted and used to dilute the fresh caustic feed as needed.

The caustic scrubber process generally removes carbon dioxide ($CO_2$), sulfur (including sulfur-containing compounds, such as $H_2S$), and/or other undesirable components from the pygas (or combined) stream, and thereby produces a purified gas stream and a spent caustic solution bottoms stream. In some embodiments, the purified gas stream is $CO_2$-depleted and/or sulfur-depleted relative to the pygas stream and/or combined feedstock stream to the caustic scrubber process. In some embodiments, the caustic scrubber process produces a purified gas stream comprising not more than 1 ppm $CO_2$. The spent caustic stream may comprise one or more components that have been removed from the gas stream, such as dissolved carbon dioxide ($CO_2$) and/or hydrogen sulfide ($H_2S$). The spent caustic stream (or at least a portion thereof) may then be introduced to a wastewater treatment facility and/or used in a halogen neutralization process (described in greater detail below).

As noted above, in some embodiments, the caustic scrubber process may be located within a cracker facility. As shown in FIG. 1, at least a portion of the pygas can be introduced into a cracker facility. In some embodiments, at least 50, at least 75, at least 90, or at least 95 percent of the pygas from the pyrolysis facility can be introduced into the cracker facility. Additionally, or alternatively, all or a portion of the pygas may be introduced into at least one location downstream of the cracker furnace.

When introduced into a location downstream of the cracker furnace, the pygas may be introduced into one or more of the following locations: (i) upstream of the initial compression zone, which compresses the vapor portion of the furnace effluent in two or more compression stages; (ii) within the initial compression zone; and/or (iii) downstream of the initial compression zone but upstream of a caustic scrubber process. In some cases, the pygas stream may be introduced into only one of these locations, while, in other cases, the pygas stream may be divided into additional fractions and each fraction introduced into a different location. In such cases, the fractions of the pygas may be introduced into at least two, or all, of the locations shown in FIG. 1.

The location where the pygas stream may be introduced into the cracker facility may depend on the pressure of the pygas stream, which will depend on whether a compression zone is used upstream of any pygas treatment and the conditions of the pygas treatment process(es). For example, if there is no compression zone upstream of the pygas treatment, then the treated pygas stream may need to be introduced upstream of the initial compression section of the cracker facility. However, if there is a compression zone upstream of the pygas treatment, then the treated pygas stream may be introduced into a location downstream of the initial compression section of the cracker facility.

When introduced into the initial compression section, the pygas may be introduced upstream of the first compression stage, upstream or downstream of the last compression stage, or upstream of one or more intermediate compression stages.

The cracker facility process generally comprises feeding a hydrocarbon feed into the inlet of a cracker furnace. The hydrocarbon feed may comprise predominantly C3 to C5 hydrocarbon components, C5 to C22 hydrocarbon components, or C3 to C22 hydrocarbon components, or even predominantly C2 components. The hydrocarbon feed may include recycled content from one or more sources, or it may include non-recycled content. Additionally, in some cases, the hydrocarbon feed may not include any recycled content. In some embodiments, the hydrocarbon feed can comprise at least a portion of the pyoil stream produced from the pyrolysis facility (described above).

In one embodiment or in combination with one or more embodiments disclosed herein, the cracker furnace can be operated at a product outlet temperature (e.g., coil outlet temperature) of at least 700° C., at least 750° C., at least 800° C., or at least 850° C. The feed to the cracker furnace can have a number average molecular weight (Mn) of less than 3000, less than 2000, less than 1000, or less than 500 g/mole. If the feed to the cracker furnace contains a mixture of components, the Mn of the cracker feed is the weighted average Mn of all feed components, based on the mass of the individual feed components. The feed to the cracker furnace can comprise less than 5, less than 2, less than 1, less than 0.5, or 0.0 weight percent of coal, biomass, and/or solids. In certain embodiments, a co-feed stream, such as steam or a sulfur-containing stream (for metal passivation) can be introduced into the cracker furnace. The cracker furnace can include both convection and radiant sections and can have a tubular reaction zone (e.g., coils in one or both of the convection and radiant sections). Typically, the residence time of the streams passing through the reaction zone (from the convection section inlet to the radiant section outlet) can be less than 20 seconds, less than 10 seconds, less than 5 seconds, or less than 2 seconds.

The hydrocarbon feed can be thermally cracked within the furnace to form a lighter hydrocarbon effluent. The effluent stream can then be cooled in the quench zone and compressed in the compression zone. The compressed stream from the compression zone then be fed as a cracked gas stream to a caustic scrubber process and then can be further separated in the separation zone to produce at least one recycled content chemical product (r-product) and/or coproduct(s). Examples of recycled content products and coproducts include, but are not limited to, recycled content ethane (r-ethane), recycled content ethylene (r-ethylene), recycled content propane (r-propane), recycled content propylene (r-propylene), recycled content butane (r-butane), recycled content butenes (r-butenes), recycled content butadiene (r-butadiene), and recycled content pentanes and heavier (r-C5+). In some embodiments, at least a portion of the recycled content stream (e.g., r-ethane or r-propane) may be returned to the inlet of the cracker furnace as a reaction recycle stream.

When the one or more treated pygas streams are introduced into the cracking facility, the treated pygas may be combined with at least a portion of the cracker effluent (as described above), for example a cracked gas stream, and the combined gas stream may be fed to a caustic scrubber process and/or otherwise processed in the same or similar manner as the cracked gas described above. For example, after treatment in the caustic scrubber, the gas stream can be optionally dehydrated and/or compressed, and introduced into a cryogenic separation process to produce various recycled content chemical products and coproducts, which may be the same or different from those described above. In some embodiments, the recycled content chemical product(s) and co-product(s) comprise olefins (e.g., C2-C5 alkenes), alkanes (e.g., C2-C5 alkanes), aromatics (e.g., benzene, toluene, xylenes, styrene), hydrogen ($H_2$), paraffins, gasoline, and/or C5+ hydrocarbons. In some embodiments, the recycled content product(s) and co-product(s)

comprise r-ethylene, r-propylene, r-butylene, r-benzene, r-toluene, r-xylenes, and/or r-styrene.

As noted above, in some embodiments, at least a portion of the spent caustic stream (e.g., from the cracker facility caustic scrubber) may be recycled for use in a halogen neutralization process. As shown in FIG. 3, the halogen neutralization process may comprise a caustic scrubber process for neutralizing and removing halogens (e.g., HCl) from the halogen-enriched gaseous material produced in a waste plastic liquification process. In some embodiments, the halogen neutralization process comprises a caustic scrubber process similar to the caustic scrubber for treating the pygas and/or cracked gas described above. However, it will be understood that the halogen neutralization scrubber may have different geometries and internal designs due at least in part to the compositional differences in the gas materials being treated and the primary impurities being removed.

In some embodiments, the spent caustic stream is recycled and fed to an upper stage of a halogen neutralization scrubber vessel. The spent caustic stream generally comprises a quantity of unused (unreacted) caustic component, which can be any of the caustic components described above. When the liquid caustic solution contacts the halogens in the gas phase, the halogens react with the caustic components and dissolve into the liquid phase, which is removed as wastewater. For example, when the caustic component comprises a sodium salt (e.g., sodium hydroxide), hydrochloric acid (HCl) in the gas will react to form sodium chloride (NaCl), which dissolves into the liquid phase and is removed from the system with the wastewater.

In some embodiments, the halogen-enriched gaseous material comprises greater than 1, 2, 5, 10, 50, 100, or 1000 ppm of inorganic halogens, such as HCl, prior to neutralization. In some embodiments, the gaseous material may have even higher inorganic halogen content, such as 1 to 5 percent by volume. However, after neutralization, the halogen-depleted gas stream generally comprises not more than 100, 50, 10, 5, 2, or 1 ppm inorganic halogens. The halogen neutralization process, and in particular the caustic scrubber halogen neutralization process can removes at least 50, 60, 70, 80, 90, 95, 99 percent of the inorganic halogens from the gaseous material.

Definitions

It should be understood that the following is not intended to be an exclusive list of defined terms. Other definitions may be provided in the foregoing description, such as, for example, when accompanying the use of a defined term in context.

Unless otherwise expressly stated, all "ppm" and "ppb" values expressed are by weight with respect to liquids and solids, and by volume with respect to gases. For multi-phase streams, "ppm" and "ppb" values expressed for components primarily in the gaseous phase are by volume, and "ppm" and "ppb" values expressed for components primarily in the liquid and/or solids phases are by weight.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the phrase "at least a portion" includes at least a portion and up to and including the entire amount or time period.

As used herein, the term "chemical recycling" refers to a waste plastic recycling process that includes a step of chemically converting waste plastic polymers into lower molecular weight polymers, oligomers, monomers, and/or non-polymeric molecules (e.g., hydrogen, carbon monoxide, methane, ethane, propane, ethylene, and propylene) that are useful by themselves and/or are useful as feedstocks to another chemical production process(es).

As used herein, the term "co-located" refers to the characteristic of at least two objects being situated on a common physical site, and/or within one mile of each other.

As used herein, the term "commercial scale facility" refers to a facility having an average annual feed rate of at least 500 pounds per hour, averaged over one year.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the term "cracking" refers to breaking down complex organic molecules into simpler molecules by the breaking of carbon-carbon bonds.

As used herein, the term "depleted" refers to having a concentration of a specific component that is less than the concentration of that component in a reference material or stream.

As used herein, the term "enriched" refers to having a concentration of a specific component that is greater than the concentration of that component in a reference material or stream.

As used herein, the term "free water" refers to water previously added (as liquid or steam) to the pyrolysis unit and water generated in the pyrolysis unit.

As used herein, the term "halogen" or "halogens" refers to organic or inorganic compounds, ionic, or elemental species comprising at least one halogen atom.

As used herein, the terms "including," "include," and "included" have the same open-ended meaning as "comprising," "comprises," and "comprise" provided above.

As used herein, the term "located remotely" refers to a distance of greater than 1, 5, 10, 50, 100, 500, 1000, or 10,000 miles between two facilities, sites, or reactors. As used herein, the term "predominantly" means more than 50 percent by weight. For example, a predominantly propane stream, composition, feedstock, or product is a stream, composition, feedstock, or product that contains more than 50 weight percent propane.

As used herein, the term "pyrolysis" refers to thermal decomposition of one or more organic materials at elevated temperatures in an inert (i.e., substantially oxygen free) atmosphere.

As used herein, the terms "pyrolysis gas" and "pygas" refer to a composition obtained from pyrolysis that is gaseous at 25° C.

As used herein, the terms "pyrolysis oil" or "pyoil" refers to a composition obtained from pyrolysis that is liquid at 25° C. and 1 atm.

As used herein, the term "pyrolysis residue" refers to a composition obtained from pyrolysis that is not pyrolysis gas or pyrolysis oil and that comprises predominantly pyrolysis char and pyrolysis heavy waxes.

As used herein, the term "recycled content" refers to being or comprising a composition that is directly and/or indirectly derived from recycled material.

As used herein, the term "refined oil" refers to a natural (i.e., non-synthetic) oil that has been subjected to a distillation and/or purification step.

As used herein, the term "spent caustic stream" refers to a stream that comprises a caustic component and has been discharged from a caustic treatment unit, such as a caustic scrubber unit.

As used herein, the term "waste material" refers to used, scrap, and/or discarded material.

As used herein, the terms "waste plastic" and "plastic waste" refer to used, scrap, and/or discarded plastic materials.

When a numerical sequence is indicated, it is to be understood that each number is modified the same as the first number or last number in the numerical sequence or in the sentence, e.g., each number is "at least," or "up to" or "not more than" as the case may be; and each number is in an "or" relationship. For example, "at least 10, 20, 30, 40, 50, 75 wt. % . . . " means the same as "at least 10 wt. %, or at least 20 wt. %, or at least 30 wt. %, or at least 40 wt. %, or at least 50 wt. %, or at least 75 wt. %," etc.; and "not more than 90 wt. %, 85, 70, 60 . . . " means the same as "not more than 90 wt. %, or not more than 85 wt. %, or not more than 70 wt. % . . . ." etc.; and "at least 1%, 2%, 3%, 4%, 5%, 6%, 7%, 8%, 9% or 10% by weight . . . " means the same as "at least 1 wt. %, or at least 2 wt. %, or at least 3 wt. % . . . " etc.; and "at least 5, 10, 15, 20 and/or not more than 99, 95, 90 weight percent" means the same as "at least 5 wt. %, or at least 10 wt. %, or at least 15 wt. % or at least 20 wt. % and/or not more than 99 wt. %, or not more than 95 wt. %, or not more than 90 weight percent . . . " etc.

Additional Claim Supporting Description—First Embodiment

In a first embodiment of the present technology, there is provided a chemical recycling process comprising: (a) introducing a solid waste plastic into a liquefaction process and producing a liquified waste plastic and a halogen-enriched gaseous material; (b) pyrolyzing at least a portion of the liquified waste plastic to thereby produce a pyrolysis effluent comprising a pyrolysis gas (pygas) and a pyrolysis oil (pyoil); (c) separating at least a portion of the pyrolysis effluent to produce a pygas stream and a pyoil stream; (d) introducing at least a portion of the pygas stream into a first caustic scrubber process and producing at least a carbon dioxide ($CO_2$) and/or sulfur-depleted scrubber effluent stream and a spent caustic stream; and (e) scrubbing at least a portion of the halogen-enriched gaseous material in a second caustic scrubber process using at least a portion of the spent caustic stream to thereby produce a halogen-depleted gas stream and a wastewater stream.

The first embodiment described in the preceding paragraph can also include one or more of the additional aspects/features listed in the following bullet pointed paragraphs. Each of the below additional features of the first embodiment can be standalone features or can be combined with one or more of the other additional features to the extent consistent. Additionally, the following bullet pointed paragraphs can be viewed as dependent claim features having levels of dependency indicated by the degree of indention in the bulleted list (i.e., a feature indented further than the feature(s) listed above it is considered dependent on the feature(s) listed above it).

Wherein the liquefaction process comprises:
  (i) liquefying the solid waste plastic to produce the liquefied waste plastic;
  (ii) introducing a stripping gas into the liquefied waste plastic to produce a multi-phase mixture; and
  (iii) disengaging a gaseous phase from a liquid phase of the multi-phase mixture to thereby provide the halogen-enriched gaseous material and the liquefied waste plastic.

Wherein said stripping gas comprises nitrogen, steam, methane, carbon monoxide, hydrogen, natural gas, or a combination thereof.

Wherein the liquefying comprises melting, plasticizing, dissolving, and/or depolymerizing the solid waste plastic.

Wherein the liquefying comprises melting at least a portion of the solid waste plastic in a melt tank, wherein the melt tank is maintained at a temperature of 200 to 500° C.

Wherein the liquefying comprises dissolving of the solid waste plastic in the presence of at least one dissolution solvent.
  Wherein the dissolution solvent comprises a pyrolysis oil.

Wherein the liquefied waste plastic has a viscosity of less than 3,000 poise at 350° C. and 10 radians/s.

Wherein the liquefied waste plastic has a halogen content of not more than 1,000 ppm.

Wherein the halogen-enriched gaseous material comprises greater than 1, 2, 5, 10, 50, 100, 1000 ppm inorganic halogens.
  Wherein the halogen-enriched gaseous material comprises 1 to 5 percent by volume of inorganic halogens.

Wherein the halogen-depleted gas stream comprises not more than 100, 50, 10, 5, 2, 1 ppm inorganic halogens.

Wherein the second caustic scrubber process removes at least 50, 60, 70, 80, 90, 95, 99 percent of the inorganic halogens from the gaseous material.

Wherein the wastewater stream comprises NaCl.

Wherein the halogen-enriched gaseous material comprises hydrochloric acid (HCl).
  Wherein the second caustic scrubber process comprises contacting the halogen-enriched gaseous material with the spent caustic stream, thereby absorbing and neutralizing at least a portion of the HCl in the halogen-enriched material, and producing a halogen-depleted gas stream and a halogen-enriched wastewater stream (i.e., neutralization comprises converting the Cl content from HCl to NaCl).

Further comprising treating the pygas stream to remove CO2, sulfur, and/or halogens prior to introducing (d).

Wherein the first caustic scrubber process is located within a cracker furnace facility.

Additional Claim Supporting Description—Second Embodiment

In a second embodiment of the present technology, there is provided a chemical recycling process comprising: (a) introducing a solid waste plastic into a liquefaction process and producing a liquified waste plastic and a halogen-enriched gaseous material; (b) introducing a feedstock comprising at least a portion of a cracker furnace effluent into a first caustic scrubber process and thereby producing at least a carbon dioxide ($CO_2$) and/or sulfur-depleted effluent stream and a spent a spent caustic stream; and (c) scrubbing at least a portion of the halogen-enriched gaseous material in a second caustic scrubber process using at least a portion of the spent caustic stream to thereby produce a halogen-depleted gas stream and a wastewater stream.

The second embodiment described in the preceding paragraph can also include one or more of the additional aspects/features listed in the following bullet pointed paragraphs. Each of the below additional features of the second embodiment can be standalone features or can be combined with one or more of the other additional features to the extent consistent. Additionally, the following bullet pointed paragraphs can be viewed as dependent claim features having levels of dependency indicated by the degree of indention in the bulleted list (i.e., a feature indented further than the feature(s) listed above it is considered dependent on the feature(s) listed above it).

- Further comprising:
  - (i) pyrolyzing at least a portion of the liquified waste plastic to thereby produce a pyrolysis effluent comprising a pyrolysis gas (pygas) and a pyrolysis oil (pyoil);
  - (ii) separating at least a portion of the pyrolysis effluent to produce a pygas stream and a pyoil stream;
  - (iii) combining at least a portion of the pygas stream and at least a portion of the cracker furnace effluent to form the feedstock.
    - Further comprising thermally cracking at least a portion of the pyoil stream to form at least a portion of the cracker furnace effluent.
    - Further comprising treating the pygas stream to remove CO2, sulfur, and/or halogens prior to combining (iii).
- Wherein the liquefaction process comprises:
  - (i) liquefying the solid waste plastic to produce the liquefied waste plastic;
  - (ii) introducing a stripping gas into the liquefied waste plastic to produce a multi-phase mixture; and
  - (iii) disengaging a gaseous phase from a liquid phase of the multi-phase mixture to thereby provide the halogen-enriched gaseous material and the liquefied waste plastic.
    - Wherein said stripping gas comprises nitrogen, steam, methane, carbon monoxide, hydrogen, natural gas, or a combination thereof.
    - Wherein the liquefying comprises melting, plasticizing, dissolving, and/or depolymerizing the solid waste plastic.
    - Wherein the liquefying comprises melting at least a portion of the solid waste plastic in a melt tank, wherein the melt tank is maintained at a temperature of 200 to 500° C.
    - Wherein the liquefying comprises dissolving of the solid waste plastic in the presence of at least one dissolution solvent.
      - Wherein the dissolution solvent comprises a pyrolysis oil.
- Wherein the liquefied waste plastic has a viscosity of less than 3,000 poise at 350° C. and 10 radians/s.
- Wherein the liquefied waste plastic has a halogen content of not more than 1,000 ppm.
- Wherein the halogen-enriched gaseous material comprises greater than 1, 2, 5, 10, 50, 100, 1000 ppm inorganic halogens.
  - Wherein the halogen-enriched gaseous material comprises 1 to 5 percent by volume of inorganic halogens.
- Wherein the halogen-depleted gas stream comprises not more than 100, 50, 10, 5, 2, 1 ppm inorganic halogens.
- Wherein the second caustic scrubber process removes at least 50, 60, 70, 80, 90, 95, 99 percent of the inorganic halogens from the gaseous material.
- Wherein the wastewater stream comprises NaCl.
- Wherein the halogen-enriched gaseous material comprises hydrochloric acid (HCl).
  - Wherein the second caustic scrubber process comprises contacting the halogen-enriched gaseous material with the spent caustic stream, thereby absorbing and neutralizing at least a portion of the HCl in the halogen-enriched material, and producing a halogen-depleted gas stream and a halogen-enriched wastewater stream (i.e., neutralization comprises converting the Cl content from HCl to NaCl).
  - Wherein the first caustic scrubber process is located within a cracker furnace facility.

Additional Claim Supporting Description—Third Embodiment

In a third embodiment of the present technology, there is provided a chemical recycling process comprising: (a) introducing a solid waste plastic into a liquefaction process and producing a liquified waste plastic and a halogen-enriched gaseous material; and (b) scrubbing at least a portion of the halogen-enriched gaseous material in a caustic scrubbing process using a spent caustic stream to thereby produce a halogen-depleted gas stream and a wastewater stream.

The third embodiment described in the preceding paragraph can also include one or more of the additional aspects/features listed in the following bullet pointed paragraphs. Each of the below additional features of the third embodiment can be standalone features or can be combined with one or more of the other additional features to the extent consistent. Additionally, the following bullet pointed paragraphs can be viewed as dependent claim features having levels of dependency indicated by the degree of indention in the bulleted list (i.e., a feature indented further than the feature(s) listed above it is considered dependent on the feature(s) listed above it).

- herein the liquefaction process comprises:
  - (i) liquefying the solid waste plastic to produce the liquefied waste plastic;
  - (ii) introducing a stripping gas into the liquefied waste plastic to produce a multi-phase mixture; and
  - (iii) disengaging a gaseous phase from a liquid phase of the multi-phase mixture to thereby provide the halogen-enriched gaseous material and the liquefied waste plastic.
    - Wherein said stripping gas comprises nitrogen, steam, methane, carbon monoxide, hydrogen, natural gas, or a combination thereof.
    - Wherein the liquefying comprises melting, plasticizing, dissolving, and/or depolymerizing the solid waste plastic.
    - Wherein the liquefying comprises melting at least a portion of the solid waste plastic in a melt tank, wherein the melt tank is maintained at a temperature of 200 to 500° C.
    - Wherein the liquefying comprises dissolving of the solid waste plastic in the presence of at least one dissolution solvent.
      - Wherein the dissolution solvent comprises a pyrolysis oil.
- Wherein the liquefied waste plastic has a viscosity of less than 3,000 poise at 350° C. and 10 radians/s.

Wherein the liquefied waste plastic has a halogen content of not more than 1,000 ppm.

Wherein the halogen-enriched gaseous material comprises greater than 1, 2, 5, 10, 50, 100, 1000 ppm inorganic halogens.

Wherein the halogen-enriched gaseous material comprises 1 to 5 percent by volume of inorganic halogens.

Wherein the halogen-depleted gas stream comprises not more than 100, 50, 10, 5, 2, 1 ppm inorganic halogens.

Wherein the caustic scrubber process removes at least 50, 60, 70, 80, 90, 95, 99 percent of the inorganic halogens from the gaseous material.

Wherein the wastewater stream comprises NaCl.

Wherein the halogen-enriched gaseous material comprises hydrochloric acid (HCl).

Wherein the caustic scrubber process comprises contacting the halogen-enriched gaseous material with the spent caustic stream, thereby absorbing and neutralizing at least a portion of the HCl in the halogen-enriched material, and producing a halogen-depleted gas stream and a halogen-enriched wastewater stream (i.e., neutralization comprises converting the Cl content from HCl to NaCl).

Claims not Limited to Disclosed Embodiments

The preferred forms of the invention described above are to be used as illustration only and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A chemical recycling process comprising:
    (a) introducing a solid waste plastic into a liquefaction process and producing a liquified waste plastic and a halogen-enriched gaseous material;
    (b) pyrolyzing at least a portion of the liquified waste plastic to thereby produce a pyrolysis effluent comprising a pyrolysis gas (pygas) and a pyrolysis oil (pyoil);
    (c) separating at least a portion of the pyrolysis effluent to produce a pygas stream and a pyoil stream;
    (d) introducing at least a portion of the pygas stream into a first caustic scrubber process and producing at least a carbon dioxide ($CO_2$) and/or sulfur-depleted scrubber effluent stream and a spent caustic stream; and
    (e) scrubbing at least a portion of the halogen-enriched gaseous material in a second caustic scrubber process using at least a portion of the spent caustic stream to thereby produce a halogen-depleted gas stream and a wastewater stream.

2. The process according to claim 1, further comprising, prior to the introducing (d), treating at least a portion of the pygas stream to remove $CO_2$, sulfur, and/or halogens from the pygas stream, wherein the treating comprises:
    (i) removing carbon dioxide ($CO_2$) from the pygas stream in an absorber-stripper system;
    (ii) removing sulfur and/or sulfur-containing compounds from the pygas stream by contacting the pygas stream with at least one reactant material; and/or
    (iii) removing halogens from the pygas stream by contacting the pygas stream with a halogen-removal material.

3. The process according to claim 1, wherein the liquefaction process comprises:
    (i) liquefying the solid waste plastic to produce the liquefied waste plastic;
    (ii) introducing a stripping gas into the liquefied waste plastic to produce a multi-phase mixture; and
    (iii) disengaging a gaseous phase from a liquid phase of the multi-phase mixture to thereby provide the halogen-enriched gaseous material and the liquefied waste plastic.

4. The process according to claim 3, wherein the liquefying (i) comprises melting at least a portion of the solid waste plastic in a melt tank, wherein the melt tank is maintained at a temperature of 200 to 500° C.

5. The process according to claim 3, wherein the liquefying (i) comprises dissolving at least a portion of the solid waste plastic in the presence of at least one dissolution solvent comprising at least a portion of the pyrolysis oil.

6. The process according to claim 3, wherein said stripping gas comprises nitrogen, steam, methane, carbon monoxide, hydrogen, natural gas, or a combination thereof.

7. The process according to claim 1, wherein the halogen-enriched gaseous material comprises hydrochloric acid (HCl), and the second caustic scrubber process comprises contacting the halogen-enriched gaseous material with the spent caustic stream, thereby absorbing and neutralizing at least a portion of the HCl in the halogen-enriched material, and producing a halogen-depleted gas stream and a halogen-enriched wastewater stream.

8. A chemical recycling process comprising:
    (a) introducing a solid waste plastic into a liquefaction process and producing a liquified waste plastic and a halogen-enriched gaseous material;
    (b) introducing a feedstock comprising at least a portion of a cracker furnace effluent into a first caustic scrubber process and thereby producing at least a carbon dioxide ($CO_2$) and/or sulfur-depleted effluent stream and a spent caustic stream; and
    (c) scrubbing at least a portion of the halogen-enriched gaseous material in a second caustic scrubber process using at least a portion of the spent caustic stream to thereby produce a halogen-depleted gas stream and a wastewater stream.

9. The process according to claim 8, further comprising:
    (i) pyrolyzing at least a portion of the liquefied waste plastic to thereby produce a pyrolysis effluent comprising a pyrolysis gas (pygas) and a pyrolysis oil (pyoil);
    (ii) separating at least a portion of the pyrolysis effluent to produce a pygas stream and a pyoil stream;
    (iii) combining at least a portion of the pygas stream and at least a portion of the cracker furnace effluent to form the feedstock.

10. The process according to claim 8, wherein the liquefaction process comprises:
    (i) liquefying the solid waste plastic to produce the liquefied waste plastic;
    (ii) introducing a stripping gas into the liquefied waste plastic to produce a multi-phase mixture; and
    (iii) disengaging a gaseous phase from a liquid phase of the multi-phase mixture to thereby provide the halogen-enriched gaseous material and the liquefied waste plastic.

11. The process according to claim 8, wherein the liquefying (i) comprises melting at least a portion of the solid waste plastic in a melt tank, wherein the melt tank is maintained at a temperature of 200 to 500° C.

12. The process according to claim 8, wherein the liquefaction process comprises:
   (i) liquefying the solid waste plastic to produce the liquefied waste plastic;
   (ii) introducing a stripping gas into the liquefied waste plastic to produce a multi-phase mixture; and
   (iii) disengaging a gaseous phase from a liquid phase of the multi-phase mixture to thereby provide the halogen-enriched gaseous material and the liquefied waste plastic, and wherein the liquefying (i) comprises dissolving at least a portion of the solid waste plastic in the presence of at least one dissolution solvent comprising at least a portion of the pyrolysis oil.

13. The process according to claim 8, wherein the halogen-enriched gaseous material comprises hydrochloric acid (HCl).

14. The process according to claim 8, wherein the halogen-enriched gaseous material comprises hydrochloric acid (HCl), and the second caustic scrubber process comprises contacting the halogen-enriched gaseous material with the spent caustic stream, thereby absorbing and neutralizing at least a portion of the HCl in the halogen-enriched material, and producing a halogen-depleted gas stream and a halogen-enriched wastewater stream.

* * * * *